US012722404B2

(12) United States Patent
Tada et al.

(10) Patent No.: US 12,722,404 B2
(45) Date of Patent: Sep. 1, 2026

(54) PRINTING APPARATUS AND CONTROL METHOD OF PRINTING APPARATUS

(71) Applicant: CANON KABUSHIKI KAISHA, Tokyo (JP)

(72) Inventors: Shuhei Tada, Kanagawa (JP); Ryu Kobayashi, Kanagawa (JP); Tomoya Teraji, Tokyo (JP); Takahiro Daikoku, Tokyo (JP); Masato Eiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 18/542,449

(22) Filed: Dec. 15, 2023

(65) Prior Publication Data

US 2024/0198696 A1 Jun. 20, 2024

(30) Foreign Application Priority Data

Dec. 20, 2022 (JP) ................................ 2022-203097
Aug. 28, 2023 (JP) ................................ 2023-137671

(51) Int. Cl.

*B41J 11/00* (2006.01)
*B41J 2/045* (2006.01)
*B41J 29/38* (2006.01)

(52) U.S. Cl.

CPC ......... *B41J 11/0022* (2021.01); *B41J 2/0454* (2013.01); *B41J 11/007* (2013.01); *B41J 29/38* (2013.01); *B41J 2203/01* (2020.08)

(58) Field of Classification Search

CPC ................ B41J 11/002; B41J 11/00216; B41J 11/00212; B41J 11/00218; B41J 2203/01; G01N 27/223; B41M 7/0081; G03G 15/2039

See application file for complete search history.

(56) References Cited

U.S. PATENT DOCUMENTS 6,755,518 B2 * 6/2004 Codos ........................ B41J 2/01 347/102
2008/0211853 A1 * 9/2008 Nagashima ........ B41J 11/00212 347/19
2009/0189937 A1 * 7/2009 Naruse .................. B41J 29/393 347/13
2011/0217052 A1 * 9/2011 Usui ................. G03G 15/2039 399/15

(Continued)

FOREIGN PATENT DOCUMENTS

JP 2000284666 A 10/2000
JP 2008179107 A 8/2008

*Primary Examiner* — John P Zimmermann

(74) *Attorney, Agent, or Firm* — Canon U.S.A., Inc. IP Division

(57) ABSTRACT

A printing apparatus includes: a printing unit configured to print an image on a printing medium; a conveying unit configured to convey the printing medium on which the image is printed in a conveyance direction; a fixing unit configured to fix the image onto the printing medium by heating the printing medium on which the image is printed and that is conveyed by the conveying unit; a measuring unit configured to measure a reflected light intensity of the image on the printing medium; and a control unit configured to set a fixing condition to be used for the printing medium based on a change in the reflected light intensity measured by the measuring unit in a fixing process of the image.

23 Claims, 28 Drawing Sheets

(56) References Cited

U.S. PATENT DOCUMENTS

| | | | |
|---|---|---|---|
| 2015/0251451 | A1 | 9/2015 | Hamazaki |
| 2020/0276834 | A1 | 9/2020 | Mori |
| 2021/0094327 | A1 | 4/2021 | Hamada |
| 2021/0237444 | A1 | 8/2021 | Sasaki |

* cited by examiner

| ENVIRONMENT TEMPERATURE DIFFERENCE ΔT FROM ENVIRONMENT TEMPERATURE AT TIME OF FIXED STATE DETECTION | CORRECTION TEMPERATURE ΔToffset |
|---|---|
| 5°C | 3°C |
| 10°C | 6°C |
| 15°C | 9°C |
| 20°C | 12°C |
| 25°C | 15°C |

FIG.19

PRINTING APPARATUS AND CONTROL METHOD OF PRINTING APPARATUS

BACKGROUND

Field of the Disclosure

The present disclosure relates to a printing apparatus including a fixing unit configured to fix a printed image with heat and a control method of the same.

Description of the Related Art

In the field of sign display, a latex ink that is robust to weather changes in outdoors while being an environment-friendly aqueous ink and that has such a versatility that it can be printed on any printing medium is attracting attention. A latex ink printer fixes the latex ink by vaporizing water content and melting and curing a latex with a heater. Accordingly, a fixation temperature condition needs to be set depending on the printing medium. In the field of sign display, a medium provided by a third party (referred to as third medium) is mainly used. Thus, many manual adjustments by a user are required, and this has become a burden.

Japanese Patent Laid-Open No. 2000-284666 (hereinafter, referred to as Literature 1) proposes a technique of detecting a fixed state by measuring a reflected light intensity of a printed product after fixation by using an optical sensor.

The technique of Literature 1 requires parameters to be used for comparison with measurement data, and cannot handle the case where an unknown printing medium such as the third media is used.

SUMMARY

A printing apparatus according to an aspect of the present disclosure includes a printing unit configured to print an image on a printing medium, a conveying unit configured to convey the printing medium on which the image is printed in a conveyance direction, a fixing unit configured to fix the image onto the printing medium by heating the printing medium on which the image is printed and that is conveyed by the conveying unit, a measuring unit configured to measure a reflected light intensity of the image on the printing medium, and a control unit configured to set a fixing condition to be used for the printing medium based on a change in the reflected light intensity measured by the measuring unit in a fixing process of the image.

Further features of the present disclosure will become apparent from the following description of embodiments with reference to the attached drawings.

BRIEF DESCRIPTION OF THE DRAWINGS

FIG. 19 is a diagram illustrating examples of correction values;

DESCRIPTION OF THE EMBODIMENTS

Figure 1A:
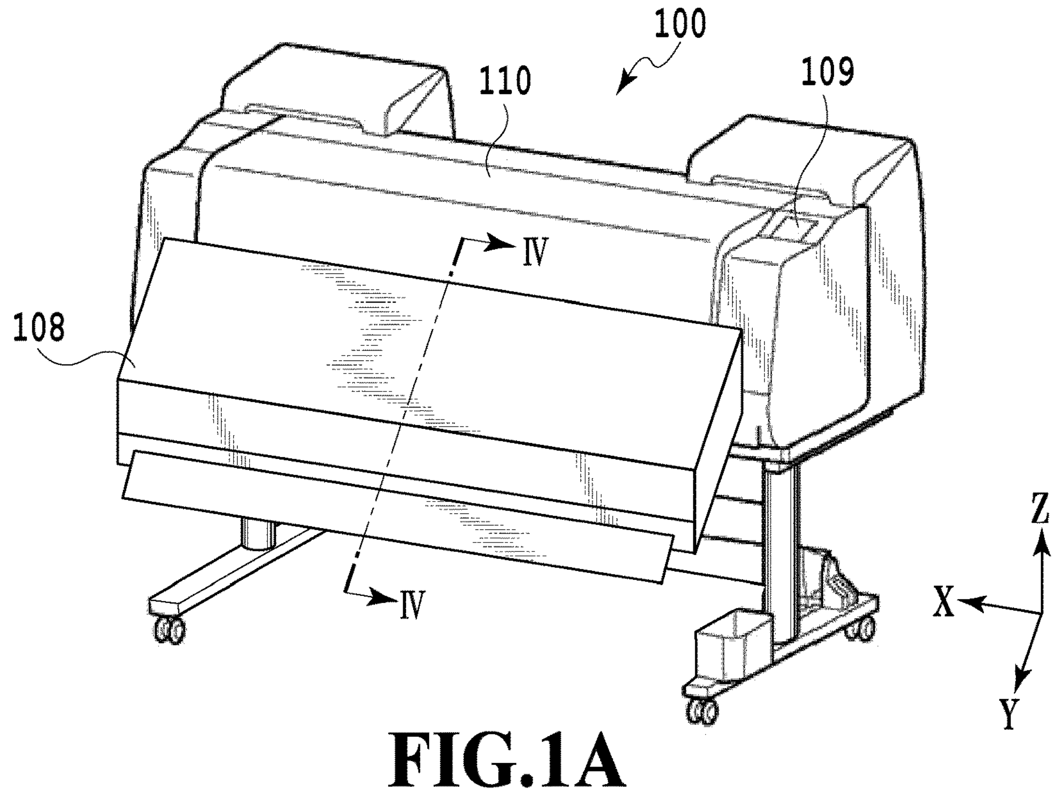
FIGS. 1A and 1B are perspective diagrams illustrating a configuration of a printing apparatus.

Preferable embodiments of the present disclosure are described below in detail with reference to the attached drawings. Note that the following embodiments do not limit the matters of the present disclosure, and not all of the combinations of features described in the following embodiments are necessarily essential for the solving means of the present disclosure. Note that the same constituent elements are denoted by the same reference numerals.

First Embodiment

<Overall Configuration>

Figure 1B:
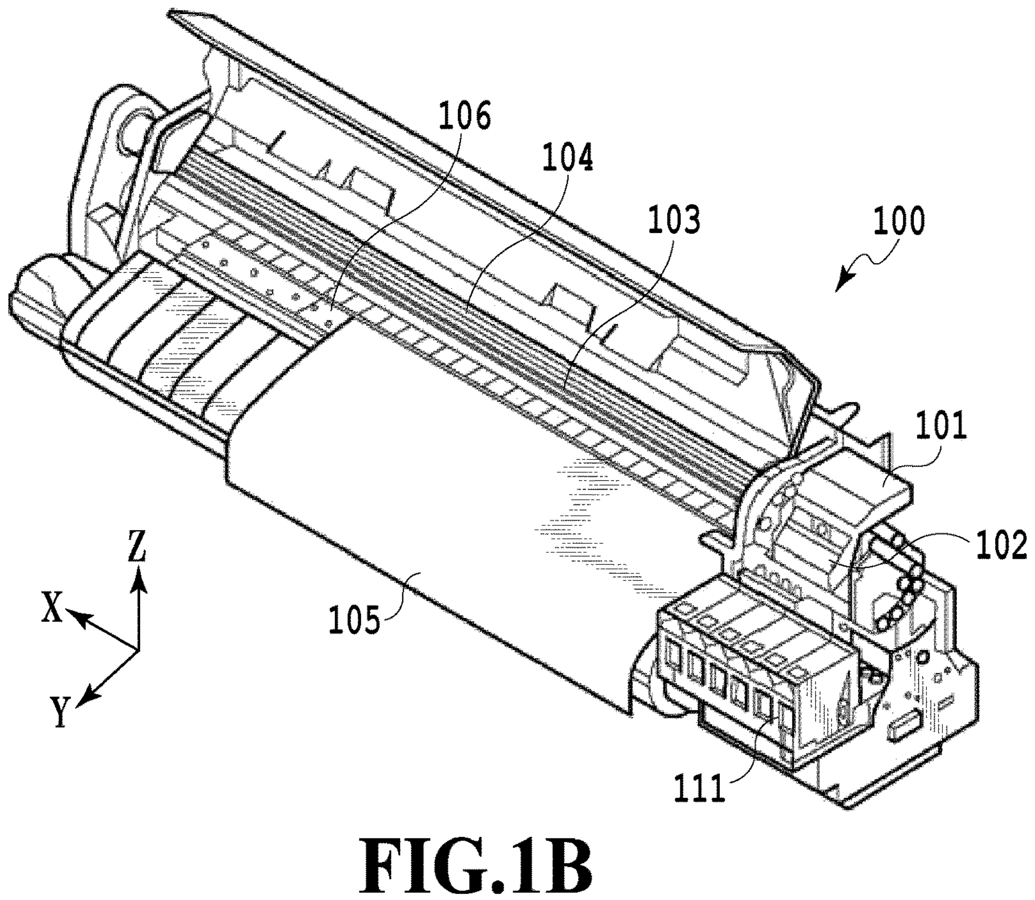

FIGS. 1A and B are perspective diagrams illustrating a configuration of a printing apparatus 100. FIG. 1A is a diagram illustrating an outer appearance of the entire printing apparatus 100. FIG. 1B is a diagram illustrating a state where an upper cover 110 in FIG. 1A is opened and an inner structure is viewable. The printing apparatus 100 in the present embodiment includes a printing unit which performs printing by applying ink droplets on a printing medium 105 as a printing agent by an inkjet printing method. The printing medium 105 is conveyed with a conveyance direction being a Y direction. A carriage 101 in which a print head 102 is mounted performs printing by reciprocally moving in an X direction intersecting the Y direction. Specifically, the printing apparatus 100 is an inkjet printing apparatus including a so-called serial type print head. However, there may be used an inkjet printing apparatus including a so-called line type print head in which nozzle arrays are formed over a print swath in the conveyance direction of the printing medium. Moreover, the printing apparatus 100 may be a multifunction peripheral in which functions such as a scan function, a FAX function, or a transmission function are integrated. Moreover, the printing apparatus 100 may be a printing apparatus of an electrophotographic method that uses a powder toner as the printing agent. In the present embodiment, a function of a process in which fixing condition setting to be described later is performed is installed in the printing apparatus 100.

The printing apparatus 100 includes an input/output unit 109 in an upper portion. The input/output unit 109 is formed of, for example, an operation panel. Specifically, the input/output unit 109 includes a display, and an ink remaining amount, candidates of a type of printing medium, and the like are displayed on the display. The user can select the type of the printing medium and perform setting of printing by operating keys on the operation panel.

The carriage 101 includes an optical sensor 201 (FIG. 2) and the print head 102 in which an ejection port surface provided with ejection ports for ejecting ink supplied from an ink tank 111 is formed. The carriage 101 is configured to be capable of reciprocally moving in the X direction (movement direction of the carriage) along a shaft 104, by drive of a carriage motor 515 (FIG. 5) via a carriage belt 103. In the present embodiment, the printing apparatus 100 can detect reflected light from a surface of the printing medium 105 by using the optical sensor 201 (measuring unit).

The printing medium 105 such as a roll paper is conveyed by a not-illustrated conveyance roller in the Y direction on a platen 106. The carriage 101 performs a printing operation by ejecting ink droplets from the print head 102 while moving in the X direction above the printing medium 105 conveyed onto the platen 106 by the conveyance roller. In the case where the carriage 101 moves to an end of a printing region on the printing medium 105, the conveyance roller conveys the printing medium 105 by a certain amount, and moves the printing medium 105 to such a position that the print head 102 can perform printing on a region to be subjected to next print scanning. The above operation is repeatedly performed to print an image. The ink used in image printing in the present embodiment is a latex ink. Applying heat to the ink causes a water content to evaporate and causes a latex resin to melt and mix with a pigment, and a film is formed and cured on the printing medium surface. In the case where a general aqueous ink is used, the printing medium needs to have an ink receiving layer for catching the ink and suppressing bleeding. Meanwhile, the latex printer can perform printing on a printing medium having no ink receiving layer. In the present embodiment, the printing medium 105 subjected to printing is conveyed to a fixing unit 108. The fixing unit 108 is arranged downstream, in the Y direction (conveyance direction), of the printing region in which the print head 102 performs the printing. Heat is applied to the conveyed printing medium 105 in the fixing unit 108, and is discharged from the fixing unit 108 in a state (finished state) where the ink is cured and fixed onto the printing medium.

<Carriage Configuration>

Figure 2:
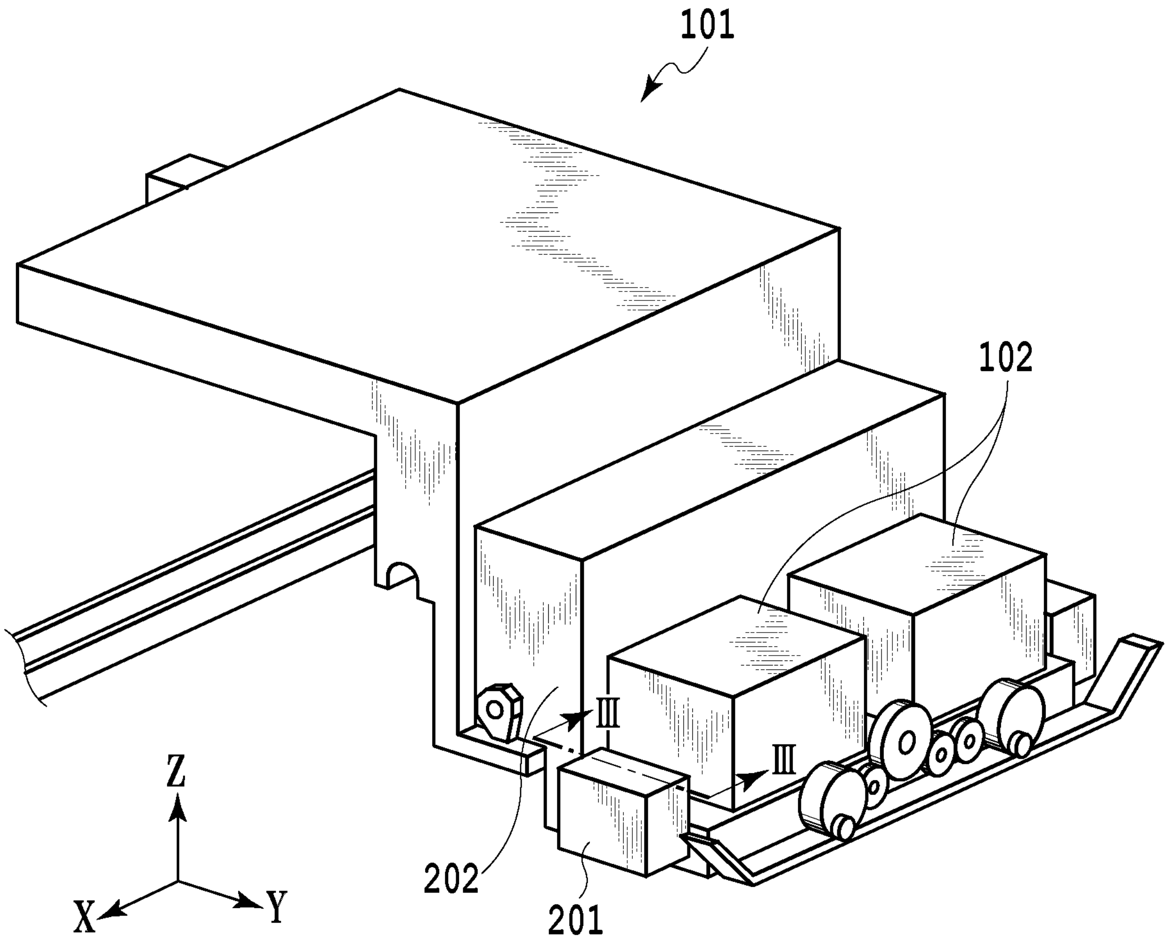
FIG. 2 is a diagram illustrating a configuration of a carriage.

FIG. 2 is a diagram illustrating a configuration of the carriage 101. The carriage 101 includes a head holder 202. The carriage 101 is a unit that can reciprocally move in the width direction (X direction) of the printing medium 105. The head holder 202 is a member that holds the print head 102 and the optical sensor 201 being a reflective sensor. As illustrated in FIG. 2, the position of the optical sensor 201 is configured such that a bottom surface of the optical sensor is at the same position as or slightly above a bottom surface of the print head 102, so as not to come into contact with the printing medium in carriage movement.

<Optical Sensor Configuration>

Figure 3:
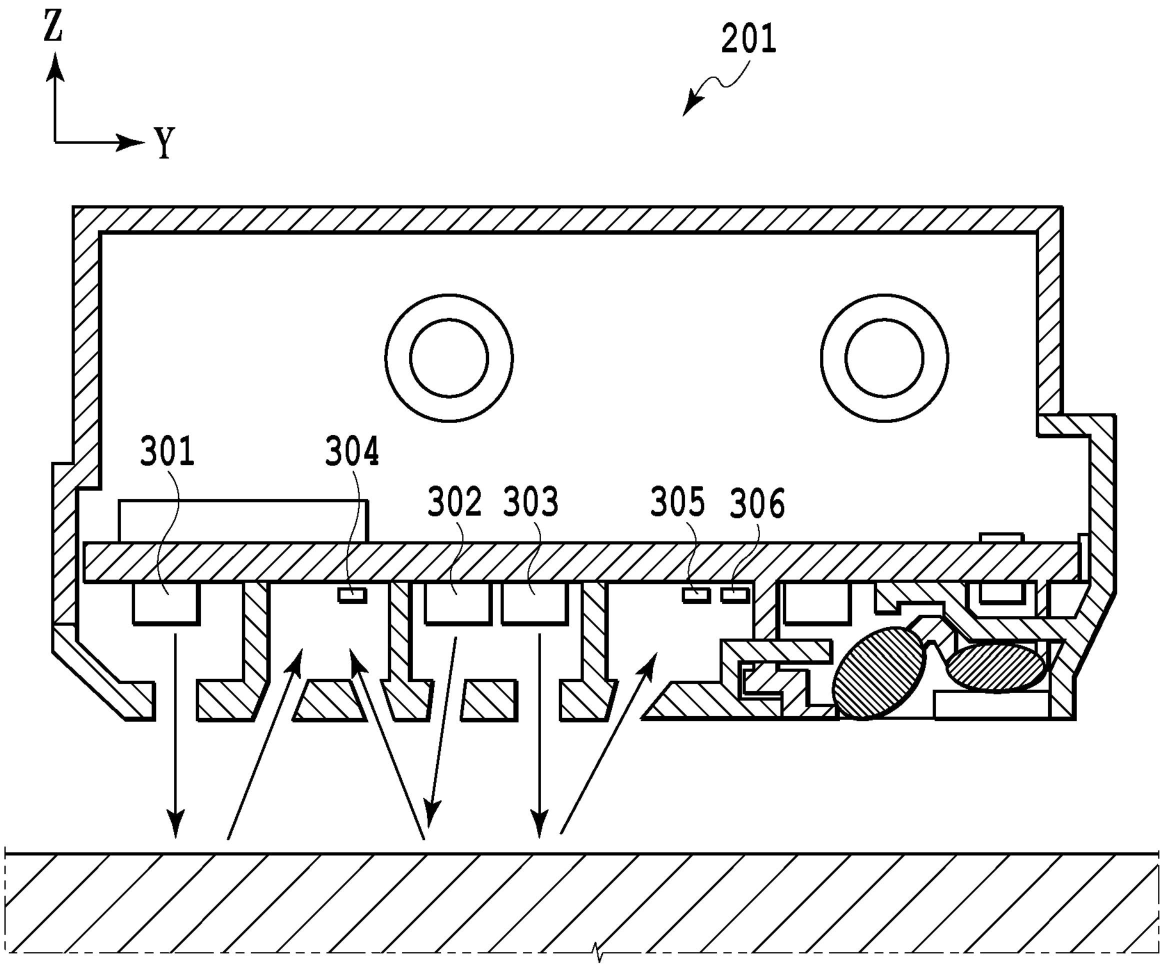
FIG. 3 is a cross-sectional schematic diagram illustrating a configuration of an optical sensor.

FIG. 3 is a cross-sectional schematic diagram illustrating a configuration of the optical sensor 201. FIG. 3 illustrates a cross section along the III-III line in FIG. 2. The optical sensor 201 includes a first LED 301, a second LED 302, a third LED 303, a first photodiode 304, a second photodiode 305, and a third photodiode 306 as optical elements. The first LED 301 is a light source having an angle of irradiation of a normal line (90°) with respect to the surface (measurement surface) of the printing medium 105. The first photodiode 304 receives reflection of light emitted from the first LED 301 and reflected on the printing medium 105, at an angle of 45° in a Z direction. Specifically, the first LED 301 and the first photodiode 304 form an optical system that detects a so-called diffuse-reflection component of the reflected light from the printing medium 105. Although the angle is not limited to 45°, the angle of 45° is preferable in consideration of robustness to fluctuation of the height of the print head 102.

The second LED 302 is a light source having an angle of irradiation of 60° in the Z direction with respect to the surface (measurement surface) of the printing medium 105. The first photodiode 304 receives reflection of light emitted from the second LED 302 and reflected on the printing medium 105, at an angle of 60° in the Z direction. Specifically, the second LED 302 and the first photodiode 304 form an optical system in which an angle of light emission and an angle of light reception are equal and that detects a so-called specular reflection component of the reflected light from the printing medium 105. Although the angle is not limited to 60°, the angle of 60° is preferable in consideration of the size of the optical sensor 201 and an SN ratio of the received light.

The third LED 303 is a light source having an angle of irradiation of a normal line (90°) with respect to the surface (measurement surface) of the printing medium 105. The second photodiode 305 and the third photodiode 306 receive reflection of light emitted from the third LED 303 and reflected on the printing medium 105. Light receiving amounts of the respective second photodiode 305 and third photodiode 306 change depending on a distance between the optical sensor 201 and the printing medium 105. The distance between the optical sensor 201 and the printing medium 105 can be thereby measured.

Although an example in which the optical sensor 201 is installed in the carriage 101 is described in the present embodiment, other forms may be employed. For example, the optical sensor may be installed by being fixed to the printing apparatus 100. Alternatively, there may be employed a form in which a measurement device for measuring characteristics of the printing medium that is separate from the printing apparatus 100 is used, and the characteristics measured by the measurement device are transmitted to the printing apparatus.

<Configuration of Fixing Unit>

Figure 4:
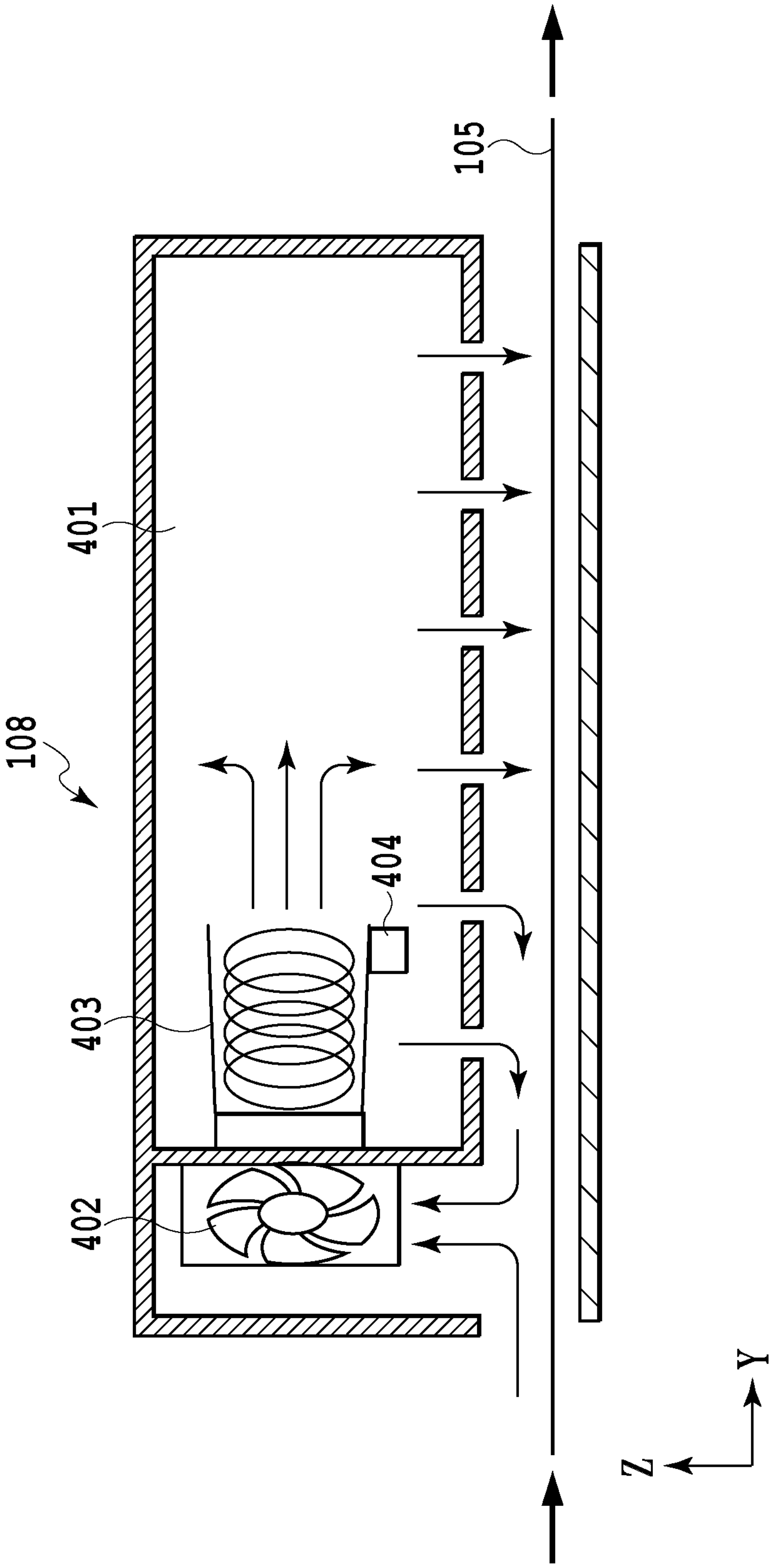
FIG. 4 is a cross-sectional schematic diagram illustrating a configuration of a fixing unit for ink fixation.

FIG. 4 is a cross-sectional schematic diagram illustrating a configuration of the fixing unit 108 for ink fixation. FIG. 4 illustrates a cross section along the IV-IV line in FIG. 1A. The printing medium 105 is assumed to be fed to the fixing unit 108 from the left side of FIG. 4 and discharged to the right side.

An axial-flow air blow fan 402 that takes in outside air and blows the air and a heater 403 that heats the air blown from the air blow fan 402 to turn the air to dry air are provided in a chamber 401. The dry air blown from an opening portion of the chamber 401 contributes to the fixation of the ink. The heater 403 includes a temperature sensor 404. Temperature feedback from the temperature sensor 404 enables more stable heater temperature control. Note that, although a non-contact ink fixing configuration using dry air and achieved by the combination of the air blow fan 402 and the heater 403 is employed in the present example, a configuration using a contact heater or a radiant heater may be employed.

<Block Diagram>

Figure 5:
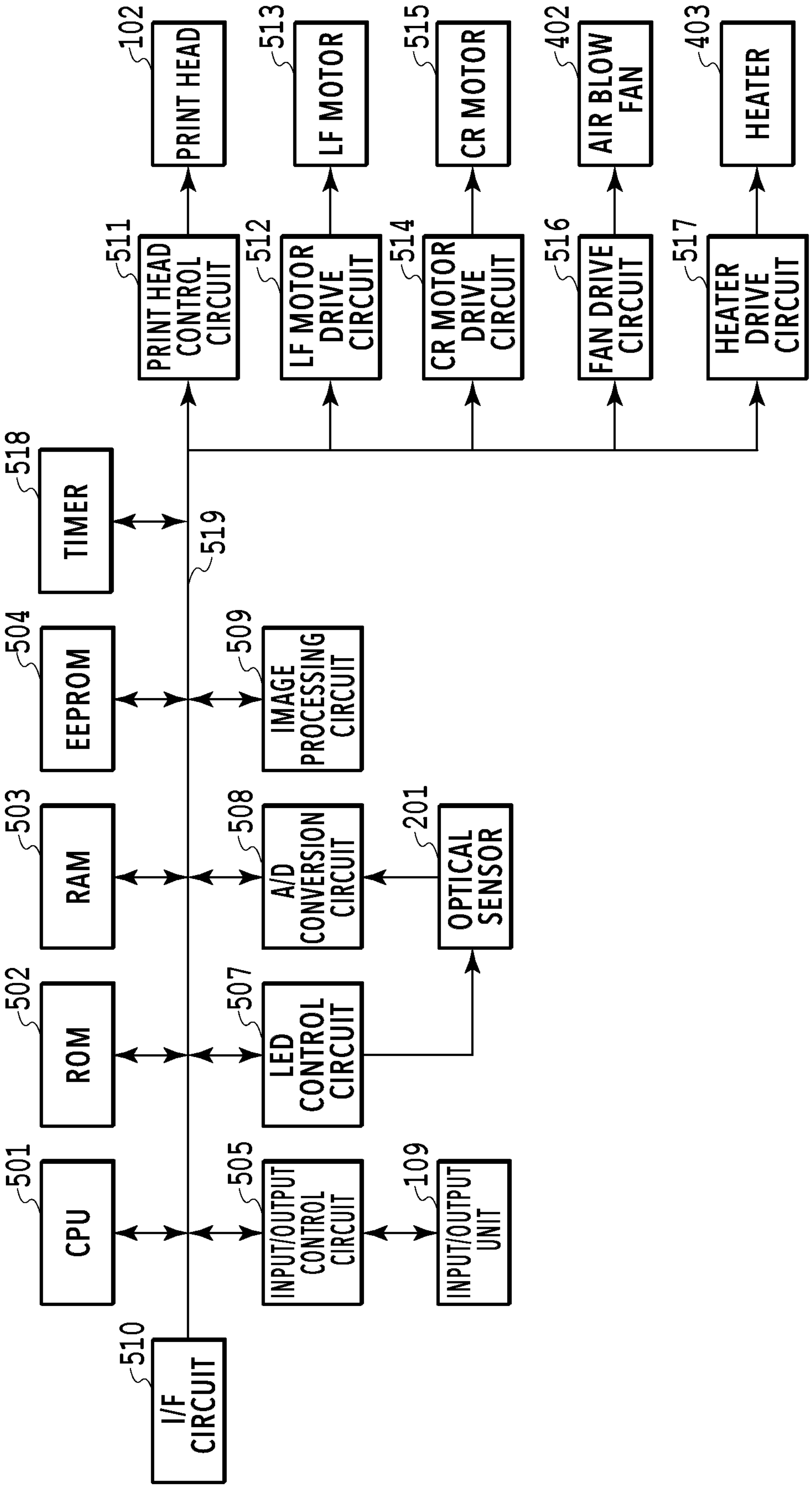
FIG. 5 is a diagram illustrating a block configuration of a control system of the printing apparatus.

FIG. 5 is a diagram illustrating a block configuration of a control system of the printing apparatus 100. A ROM 502 is a non-volatile memory, and stores, for example, a control program for controlling the printing apparatus 100 and a program for implementing operations of the present embodiment. For example, a CPU 501 implements the operations of the present embodiment by reading the program stored in the ROM 502 out to a RAM 503 and executing the program. The RAM 503 is also used as a working memory of the CPU 501. An EEPROM 504 stores data to be held even if power of the printing apparatus 100 is turned off. At least the CPU 501 and the ROM 502 implement functions as an information processing apparatus that executes processes to be described later. The EEPROM 504 stores a characteristic value and a fixing condition of each printing medium that are used as references defined in advance, a correction value of the fixing condition with respect to an ambient temperature change, and the like. The characteristic value and the fixing condition of each printing medium may be stored in a ROM of a host computer or an external memory such as a server, instead of a storage medium in the printing apparatus 100. Moreover, the CPU 501 may perform processes using information stored outside the printing apparatus 100.

An interface (I/F) circuit 510 connects the printing apparatus 100 and an external network such as an LAN to each other. The printing apparatus 100 exchanges various jobs, data, and the like with an external apparatus such as a host computer by using the I/F circuit 510.

The input/output unit 109 includes an input unit and an output unit. The input unit receives an instruction of power on, an instruction of print execution, and an instruction of setting various functions from the user. The output unit displays various pieces of apparatus information such as a power saving mode and a setting screen of various functions that can be executed by the printing apparatus 100. In the present embodiment, the input/output unit 109 is an operation panel included in the printing apparatus 100. The input/output unit 109 is connected to a system bus 519 via an input/output control circuit 505 to be capable of exchanging data with the system bus 519. In the present embodiment, the CPU 501 performs notification control of information of the output unit.

Note that the input unit may be a keyboard of an external host computer and be capable of receiving instructions of the user from the external host computer. The output unit may be an LED display, an LCD display, or a display connected to the host apparatus. Moreover, in the case where the input/output unit is a touch panel, the input/output unit can receive instructions from the user through software keys. Moreover, the input/output unit 109 may be formed of a speaker and a microphone and be configured such that an input from the user is a voice input and notification to the user is a voice output.

In the case where the measurement by the optical sensor 201 is to be executed, the CPU 501 drives an LED control circuit 507 to perform control such that a predetermined LED in the optical sensor 201 is turned on. Each of the photodiodes in the optical sensor 201 outputs a signal corresponding to the received light, an A/D conversion circuit 508 converts the signal to a digital signal, and the digital signal is temporarily saved in the RAM 503. Data to be saved also during power off of the printing apparatus 100 is stored in the EEPROM 504.

A print head control circuit 511 supplies a drive signal corresponding to print data to a nozzle drive circuit including a selector and a switch mounted in the print head 102, and performs control of a printing operation of the print head 102 such as drive order of nozzles. For example, in the case where print target data is transmitted from the outside to the I/F circuit 510, the print target data is temporarily saved in the RAM 503. Then, the print head control circuit 511 drives the print head 102 based on print data obtained by converting the print target data to print data for printing. In this case, a line feed (LF) motor drive circuit 512 drives an LF motor 513 based on a bandwidth of the print data or the like, and rotates the conveyance roller connected to the LF motor 513 to convey the printing medium 105. A carriage (CR) motor drive circuit 514 drives a carriage (CR) motor 515 to perform scanning of the carriage 101 via the carriage belt 103.

Data sent from the I/F circuit 510 includes not only the print target data but also data on contents set in a printer driver. Moreover, for example, the print target data is received from the outside via the I/F circuit 510 and stored in a storage unit such as the RAM 503, or is stored in advance in a storage unit such as a hard disk drive in some cases. The CPU 501 reads image data from the storage unit and controls an image processing circuit 509 to perform conversion (binarization process) of the image data to the print data for using the print head 102. The image processing circuit 509 executes various image processes such as color space conversion, HV conversion, gamma correction, and rotation of an image, in addition to the binarization process.

A fan drive circuit 516 controls the air blow amount from the air blow fan 402 by controlling the number of revolutions of the air blow fan 402. A heater drive circuit 517 performs temperature control of the heater 403 based on heater temperature setting information from the CPU 501 and the temperature feedback from the temperature sensor 404 installed near the heater 403. A timer 518 measures heating time by the fixing unit.

<Flow in Fixing Condition Automatic Setting>

Figure 6:
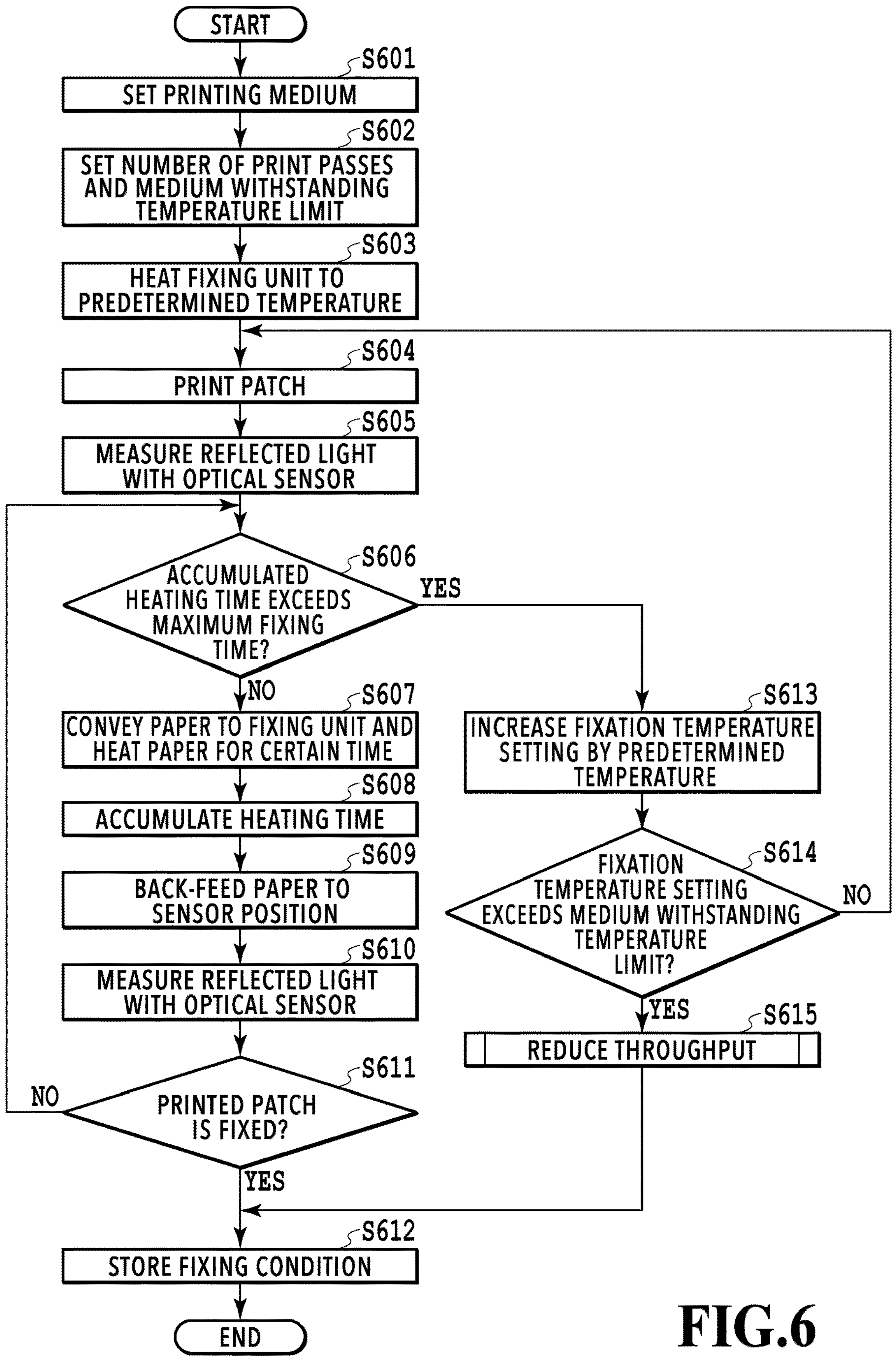
FIG. 6 is a diagram illustrating a flowchart of a process of automatically setting a fixing condition.

FIG. 6 is a diagram illustrating a flowchart of a process of automatically setting the fixing condition. The process of FIG. 6 is basically executed in the case where the user adds a type of printing medium to be used in the printing apparatus 100. Specifically, in S601, the user sets the printing medium 105 in the printing apparatus 100. Then, in S602, the user sets the number of print passes and a withstanding temperature limit of the printing medium to be added (also referred to as medium withstanding temperature limit), through the input/output unit 109. Then, in the case where the user performs an execution instruction such as pressing of an execution button through the input/output unit 109, the CPU 501 proceeds to processes of S603 and beyond. The CPU 501 implements the processes illustrated in S603 and beyond in FIG. 6 by loading a program stored in the ROM 502 onto the RAM 503 and executing the program. Note that some or all of functions of the steps in FIG. 6 may be implemented by hardware such as an ASIC or an electronic circuit. Sign "S" in the description of each process means step in the flowchart of FIG. 6 (the same applies to the following flowcharts in the present description).

In S603, the CPU 501 heats the fixing unit 108 to a predetermined temperature. In this case, the fixing unit 108 is heated to a minimum temperature (about 70° C.) required for the fixation of the ink, and is set to a stable temperature state. In the case where the temperature of the fixing unit enters the stable state, in S604, the CPU 501 prints a patch for fixed state detection on the printing medium 105. In the present example, a patch of an applying amount at the maximum printing duty printable by the printing apparatus 100 is assumed to be printed on the printing medium 105. After the patch printing, in S605, the CPU 501 measures a reflected light intensity on the printed patch by using the optical sensor 201. In the present embodiment, a process of detecting a fixed state is performed by using a change in the reflected light depending on the heating time of heating the printing medium 105 subjected to printing as described later. Specifically, control of setting the fixing condition to be used for the printing medium 105 is executed based on a change in the reflected light intensity measured in the fixing process of an image. To this end, the reflected light in the state before the heating is measured in S605. In the present example, the CPU 501 is assumed to detect and measure a specular reflection component that is obtained by emitting light from the second LED 302 at an angle of 60° in the Z direction and receiving reflected light reflected on the patch on the printing medium 105 at an angle of 60° in the Z direction.

Next, in S606, the CPU 501 determines whether an accumulated heating time exceeds maximum fixing time. In the case where the accumulated heating time exceeds the maximum fixing time, the CPU 501 proceeds to S613. In the case where the accumulated heating time does not exceed the maximum fixing time, the CPU 501 proceeds to S607. Note that S606 is a step repeatedly executed in a return process from S611 to be described later. In the case where the CPU 501 proceeds from S605 to S606, the printed patch is not supplied to the fixing unit 108. Accordingly, in the process of first S606, the CPU 501 proceeds to S607. The accumulated heating time is time obtained in S607 and S608 to be described later, and is accumulated time of time periods in which the printed patch is heated in the fixing unit 108. The maximum fixing time is time determined in advance depending on a throughput obtained from the print passes and a conveyance direction distance in the fixing unit 108, and is time for which the ink drying can be performed in normal printing. The larger the number of print passes is, the longer the time it takes for the printing medium 105 to pass the inside of the fixing unit 108 is, and thus the longer the maximum fixing time is. Moreover, the longer the conveyance direction distance in the fixing unit 108 is, the longer the time it takes for the printing medium 105 to pass the inside of the fixing unit 108 is, and thus the longer the maximum fixing time is. As a specific example, assuming that linear speed in the set print passes is 4.3 mm/sec and the conveyance direction distance in the fixing unit 108 is 400 mm, the maximum fixing time is 93 sec.

In S607, the CPU 501 conveys the printing medium 105 on which the patch is printed to the fixing unit 108, and heats the printing medium 105 for a certain heating time. The certain heating time herein can be any time defined in advance. The certain heating time is a value determined depending on a resolution at which a change in a specular reflected light intensity over time is measured. In S608, the CPU 501 accumulates and stores the heating time. For example, in the case where the CPU 501 proceeds to S608 for the first time, the accumulated heating time is the same as the certain time in S607. In the case where the CPU 501 proceeds to S608 for the second time and beyond, the accumulated heating time is a value obtained by adding the certain time of heating in S607 to the accumulated heating time up to this point.

Next, in S609, the CPU 501 back-feeds the printing medium 105 to a position facing the optical sensor 201. Then, in S610, the CPU 501 measures the specular reflected light of the patch with the optical sensor 201 again, and stores the measured specular reflected light intensity in the EEPROM 504. Next, in S611, the CPU 501 determines whether the printed patch is fixed. In S611, the CPU 501 determines whether the printed patch is fixed based on the change in the measured specular reflected light intensity. Details of the process of S611 are described later. In the case where the CPU 501 determines that the printed patch is fixed, the CPU 501 proceeds to S612. In the case where the CPU 501 determines that the printed patch is not fixed, the CPU 501 proceeds to S606. Then, the aforementioned processes are repeated.

Figure 8:
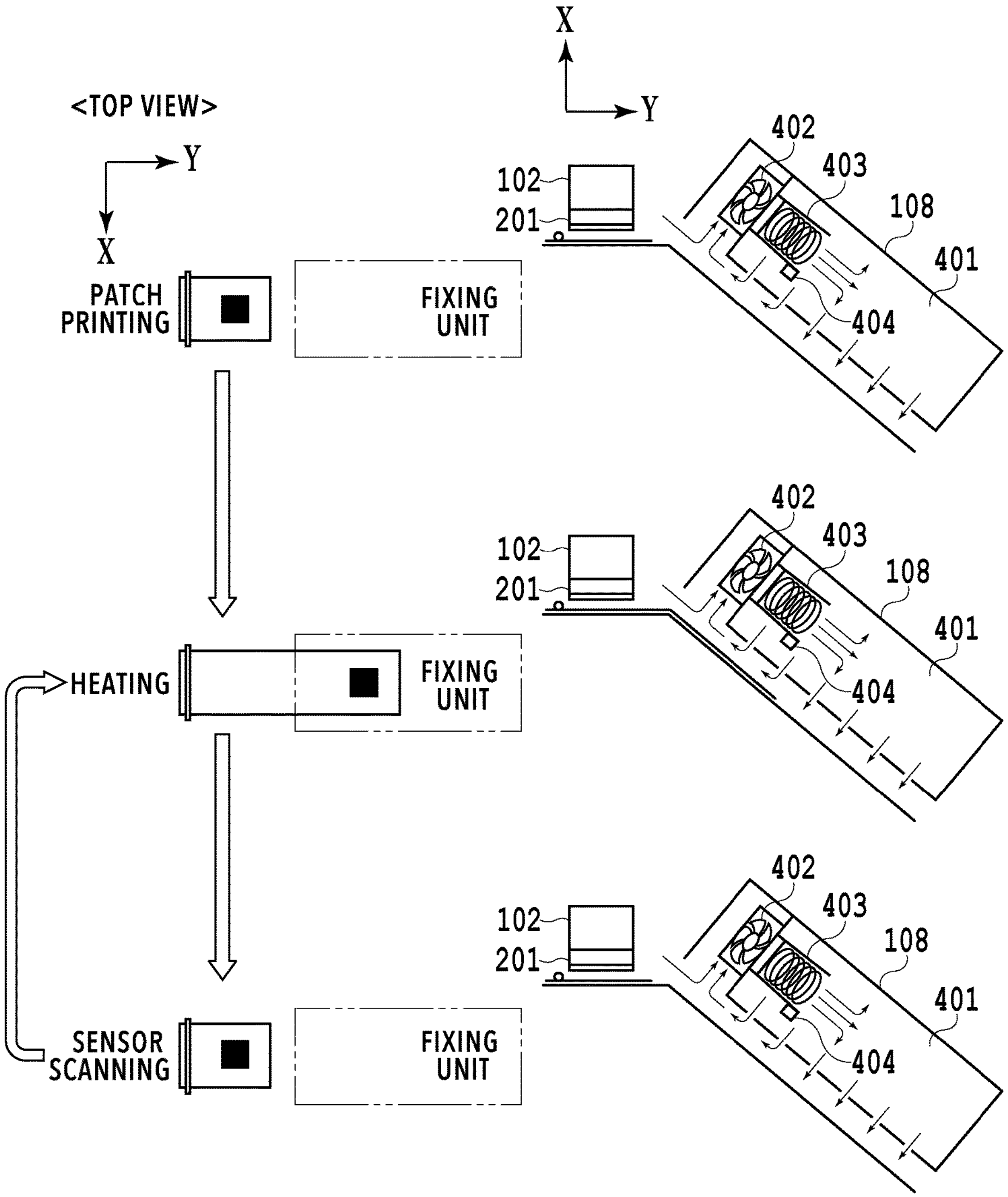
FIG. 8 is a diagram illustrating an outline of a process of detecting a fixed state of a printed patch.

FIG. 8 is a diagram illustrating an outline of the process of detecting the fixed state of the printed patch. The optical sensor 201 is arranged upstream of the fixing unit 108 in the conveyance direction of the printing medium 105. FIG. 8 illustrates a state where the printed patch is heated for the certain time in the fixing unit 108, then fed-back to the position of the optical sensor 201, and subjected to the measurement of the specular reflected light intensity.

Note that, in the present embodiment, conveyance speed in the back-feeding (conveyance in a reverse direction) in S609 is assumed to be such that high speed conveyance not affecting the accumulated heating time is performed. However, the configuration may be such that heating time to which time required for the back-feeding is added is accumulated in S608.

In the case where the CPU 501 determines that the printed patch is fixed (that is in the fixed state) in S611, in S612, the CPU 501 stores a fixation temperature and the accumulated heating time required for the fixation in the EEPROM 504 as the fixing condition. Then, the CPU 501 terminates the process of the flowchart illustrated in FIG. 6. The fixation temperature is the predetermined temperature set in S603 if there is no change from the predetermined temperature. In the case where the setting temperature is increased in S613 to be described later, the fixation temperature is the resulting increased temperature. The fixing condition stored herein is used as the fixing condition in the case where printing is performed by using the set printing medium 105.

Next, description is given of processes of S613 and beyond in the case where the CPU 501 determines that the accumulated heating time exceeds the maximum fixing time in S606. In S613, the CPU 501 increases fixation temperature setting by a predetermined temperature. In the present embodiment, the fixation temperature setting is increased by 5° C. Next, in S614, the CPU 501 determines whether the fixation temperature setting increased by the predetermined temperature exceeds the medium withstanding temperature limit. In the case where the CPU 501 determines that the fixation temperature setting increased by the predetermined temperature exceeds the medium withstanding temperature limit, the CPU 501 proceeds to S615. In S615, the CPU 501 performs a process of reducing the throughput. Details of the process of S615 are described later. Then, after S615, the CPU 501 proceeds to S612, stores the fixing condition determined in the process of reducing the throughput in the EEPROM 504, and terminates the process of the flowchart illustrated in FIG. 6. Meanwhile, in the case where the CPU 501 determines that the fixation temperature setting increased by the predetermined temperature does not exceed the medium withstanding temperature limit, the CPU 501 proceeds to S604, and performs the processes from the patch printing again.

Specifically, in the case where the patch is not fixed in the maximum fixing time at the predetermined fixation temperature, the fixation temperature setting is increased by, for example, 5° C. Then, a new patch is printed in an unused portion of the printing medium 105 that is not used in the previous fixing operations. Then, the process of determining whether the patch is fixed is continuously performed by using the newly printed patch and the fixation temperature increased by 5° C. In this case, if the fixation temperature setting increased by 5° C. exceeds the medium withstanding temperature limit, this fixation temperature setting cannot be used for the fixation of the printing medium 105. Meanwhile, the patch is not fixed in the fixation temperature setting at this point. Accordingly, in S615, the process of reducing the throughput of printing is performed to secure the fixing time, and a process of compensating for the heat amount necessary for the fixation is thereby performed. Accordingly, in S615, the fixing process is continuously performed by using the patch in middle of fixation that has been performed up to this point. Details are described below.

Figure 7:
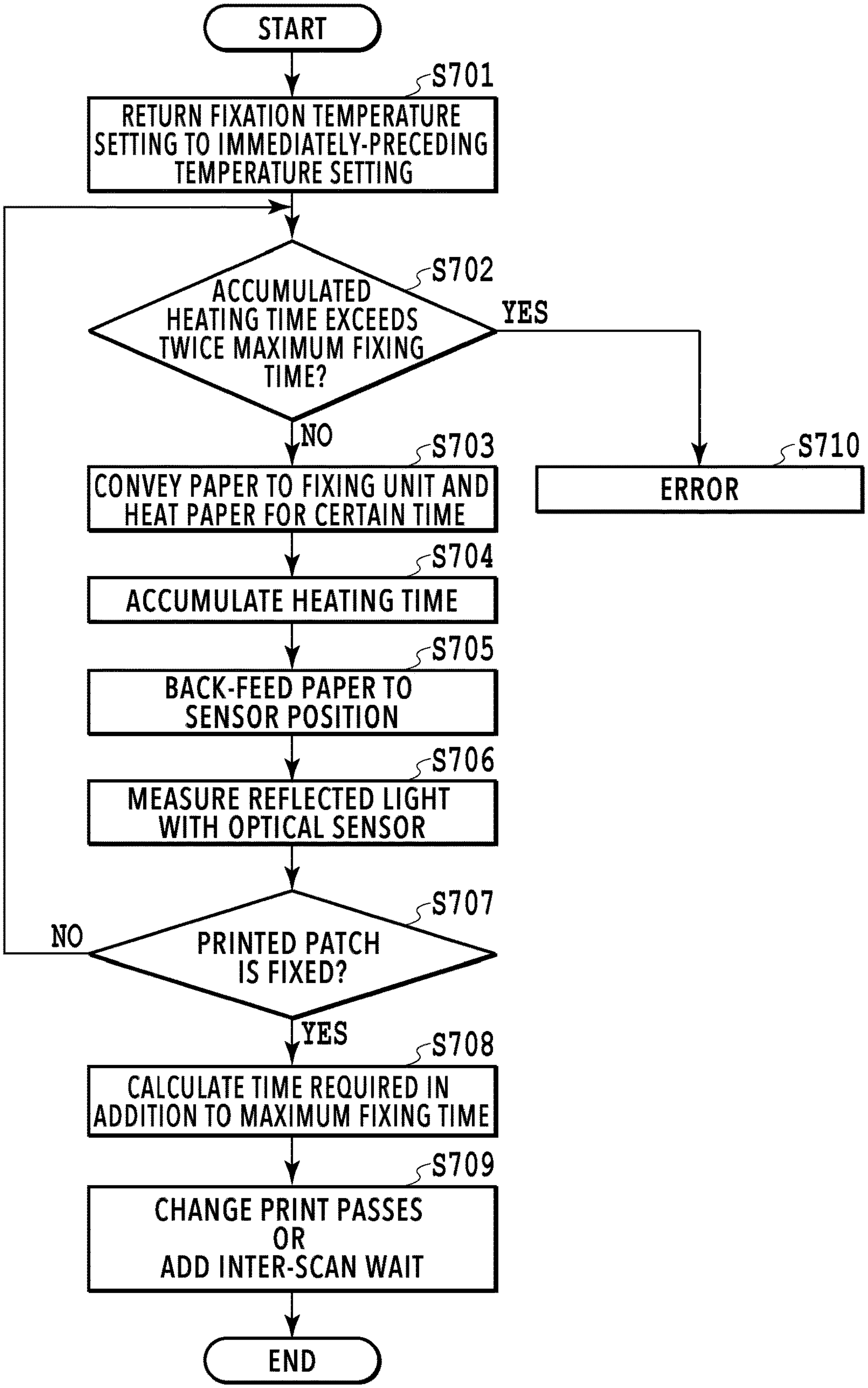
FIG. 7 is a flowchart illustrating details of S615.

FIG. 7 is a flowchart illustrating the details of S615 in FIG. 6. In S701, the CPU 501 returns the fixation temperature setting to the immediately-preceding temperature setting. Specifically, the fixation temperature setting is increased in S613, but the increased temperature exceeds the medium withstanding temperature limit. Accordingly, the fixation temperature setting is returned to the temperature before the increase in S613.

Next, in S702, the CPU 501 determines whether the accumulated heating time exceeds twice the maximum fixing time. In the case where the CPU 501 determines that the accumulated heating time exceeds twice the maximum fixing time, the CPU 501 proceeds to S710, makes determination of error, and terminates the process. Notification of error may be made to the user in this case. Specifically, a limit is set in advance for the reduction of the throughput and, in the case where the fixation is not completed within this limit, the CPU 501 determines the printing medium as a printing medium for which the fixing condition cannot be automatically set, and handles the process as an error. Note that, although twice the maximum fixing time is given as an example of the limit of reduction of the throughput in this example, the limit is not limited to this. Twice is merely an example and, for example, the detection operation may be continued for longer time or determination of error may be made in time shorter than twice the maximum fixing time.

In the case where the CPU 501 does not determine that the accumulated heating time exceeds twice the maximum fixing time, the CPU 501 proceeds to S703. Since processes of S703 to S707 in the case where determination of NO is made in S702 are the same as the processes of S607 to S611 in the case where determination of NO is made in S606, description thereof is omitted. In the case where the CPU 501 is determines that the patch is fixed in S707, that is in the case where the patch is fixed in the accumulated heating time equal to or shorter than twice the maximum fixing time, in S708, the CPU 501 calculates time required in addition to the maximum fixing time. Specifically, a portion of the heating time accumulated in S704 in the process of FIG. 7 is the time required in addition to the maximum fixing time. Then, in S709, the CPU 501 performs a process of changing the print passes, a process of adding inter-scan wait time, or both of these processes, based on the calculated additional time. Then, the CPU 501 terminates the process of the flowchart of FIG. 7, and returns to the process of FIG. 6. Information determined in S709 is stored in the EEPROM 504 by being included in the fixing condition in S612, in the case where the CPU 501 returns to the process of FIG. 6.

Note that, in the present embodiment, description is given of the example in which a fixing time is determined by gradually increasing the fixation temperature setting from a relatively-low temperature. Detecting the fixed state from a low temperature can reduce an effect of damage such as, for example, expansion and contraction of the printing medium due to heat. Moreover, detecting the fixed state from a low temperature can suppress power consumption because the detection is performed at a minimum required heat amount. If the damage due to heat is not a concern or a maximum temperature at which there is no effect on expansion and contraction of the printing medium due to heat is known, the calculation of the fixation temperature may be executed from a relatively-high temperature. In this case, the fixing condition can be determined in shorter time.

Moreover, although the process in the case where the fixation temperature setting is actually increased in S613 is described in the above example, the process is not limited to this. The CPU 501 may determine whether the fixation temperature setting exceeds the medium withstanding temperature limit in the case where the temperature is increased, before the actual setting temperature increase. Then, in the case where the CPU 501 determines that the fixation temperature setting does not exceed the medium withstanding temperature limit, the CPU 501 may increase the fixation temperature setting. In the case where the CPU 501 determines that the fixation temperature setting exceeds the medium withstanding temperature limit, the CPU 501 may proceed to S615, and perform the process of reducing the throughput. In this case, the process of "restoring the fixation temperature setting to the immediately-prior temperature" in S701 of FIG. 7 does not have to be performed.

<Fixed State Detection Method>

Figure 9A:
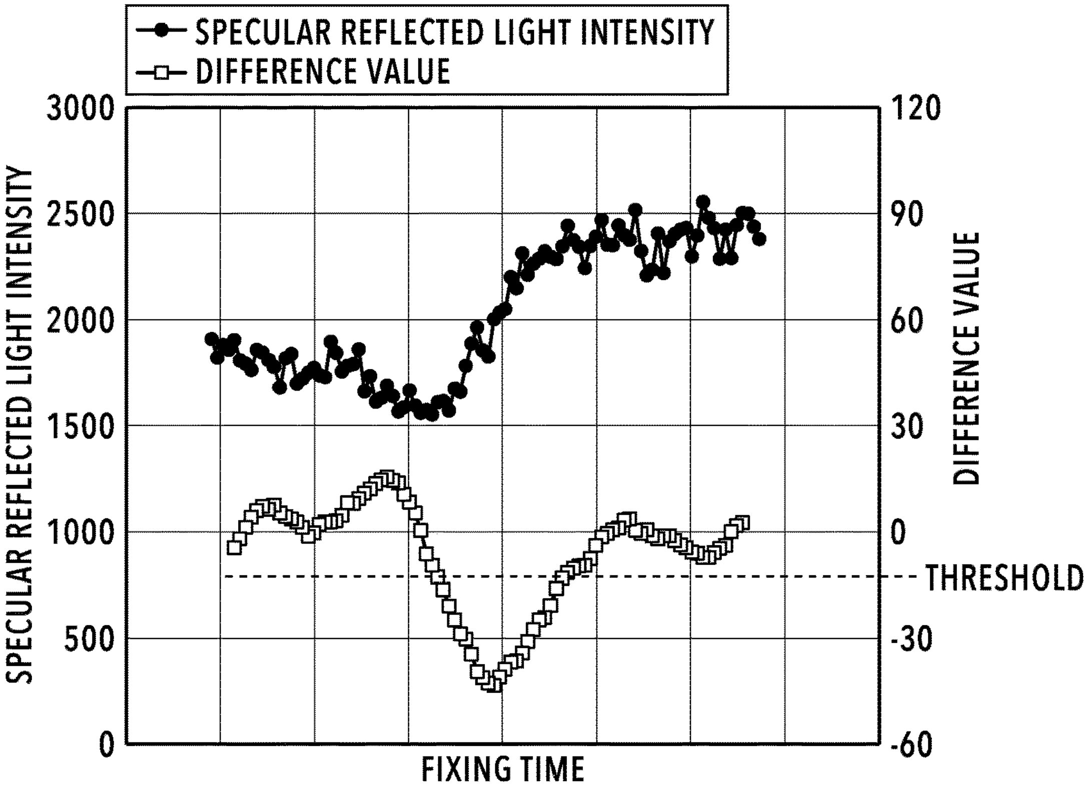
FIGS. 9A and 9B are diagrams explaining examples of detection of the fixed state.
Figure 9B:
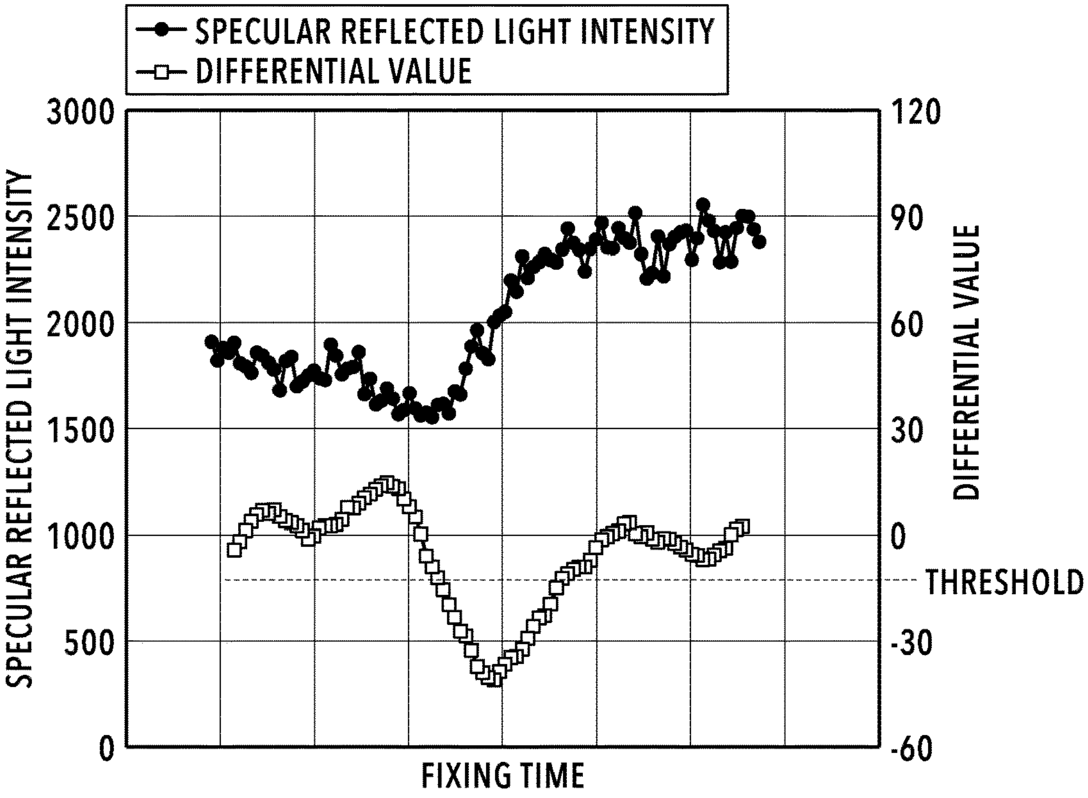

FIGS. 9A and 9B are diagrams explaining examples of detection of the fixed state. Examples of a detection process of the fixed state in S611 of FIGS. 6 and S707 of FIG. 7 are described below by using FIGS. 9A and 9B. FIGS. 9A and 9B are examples illustrating a change in the specular reflected light intensity measured by the optical sensor 201 in S604 and S610 of FIGS. 6 and S706 of FIG. 7. FIGS. 9A and 9B are examples illustrating a change in the specular reflected light intensity with lapse of the fixing time (heating time). In FIG. 9A, the vertical axis represents the specular reflected light intensity and a difference value, and the horizontal axis represents the fixing time. In FIG. 9B, the vertical axis represents the specular reflected light intensity and a differential value, and the horizontal axis represents the fixing time. It should be noted that FIGS. 9A and 9B are diagrams illustrating examples of characteristics of the specular reflected light intensity, and are diagrams also including measurement values of the specular reflected light intensity after the fixation. Moreover, FIGS. 9A and 9B illustrate an example of a printing medium with such a characteristic that the specular reflected light intensity after the fixation is higher than that before the fixation.

As illustrated in FIGS. 9A and 9B, as the fixation progresses, the specular reflected light intensity increases with respect to the specular reflected light intensity immediately after the printing of the patch. Then, in the case where the ink is in the fixed state, the specular reflected light intensity is substantially constant. In the case of a printing medium whose specular reflected light intensity after the fixation is known, it is only necessary to set a threshold of the specular reflected light intensity in advance and detect the fixed state at a time point where the measured specular reflected light intensity exceeds the threshold.

Meanwhile, in the case of a printing medium whose specular reflected light intensity after the fixation is unknown, it is only necessary to detect a state where the specular reflected light intensity changes and then becomes constant, as the fixed state. To this end, in the present embodiment, in the measurement of the specular reflected light intensity of the printed patch, the CPU 501 stores a difference value to the immediately-previous measurement value or a differential value to the immediately-previous measurement value in the EEPROM 504 as a change amount. In FIGS. 9A and 9B, the change amount of the specular reflected light intensity with lapse of the heating time is illustrated on the lower side of the graph. As described above, since the specular reflected light intensity increases as the fixation progresses, the difference value (or the differential value) that is "immediately-previous measurement value minus current measurement value" is a negative value in the state where the fixation is progressing. As illustrated in FIGS. 9A and 9B, the CPU 501 determines that the specular reflected light intensity is in the constant state and the patch is in the fixed state at a time point where the difference value (or the differential value) exceeds a certain threshold. Provided that intervals of the measurement are constant, only the absolute value varies between the difference value (FIG. 9A) and the differential value (FIG. 9B), and fluctuation waveforms are the same. Accordingly, either the difference value or the differential value may be used. However, in the case where the intervals of the measurement change in the middle of the process, the differential value is preferably used.

In FIGS. 9A and 9B, the threshold of the differential value is provided near 0 on the negative side to explain the example in which the specular reflected light intensity after the fixation becomes higher than that before the fixation. However, depending on the type of printing medium, there is a case where the specular reflected light intensity after the fixation becomes lower. In this case, the threshold of the differential value is provided near 0 on the positive side.

As described above, the patch can be determined to be in the fixed state at a time point where the absolute value of the change amount of the specular reflected light intensity increases with the heating for the certain time from a moment immediately after the printing, and then the change amount (absolute value) of the specular reflected light intensity becomes smaller than the certain threshold.

Assume a case where the fixing condition using the printed patch is stored in S612. In the case where a print process using the printing medium used in the process of FIG. 6 is performed after this storing, the print process is performed by using the stored fixing condition. Specifically, the fixing condition stored in S612 is set as the fixing condition for the printing medium set in S601. For example, in the case where the print process using the printing medium set in S601 is performed, the fixation is performed at the set fixation temperature. Moreover, in the case where the print passes are changed, the printing is performed in the setting of the changed print passes. In the case where the inter-scan wait is changed, a wait process is performed for the changed wait time in the second passes and beyond.

As described above, according to the present embodiment, the ink fixing conditions can be appropriately set for printing media including an unknown printing medium. Specifically, the fixed state of the ink to the printing medium is detected, the fixing condition is derived, and then the derived fixing condition is set. This can reduce work load of a job of setting the fixing condition performed by the user.

Second Embodiment

In the first embodiment, description is given of the example in which the optical sensor 201 mounted in the carriage 101 is used and the feeding and the back-feeding of the printing medium are repeated to measure the change in the specular reflected light intensity with lapse of the heating time in the fixing unit 108 and detect the fixed state. In the present embodiment, description is given of an example using an optical sensor arranged at a different position from the optical sensor 201 described in the first embodiment. Specifically, in the present embodiment, description is given of an example as follows. An optical sensor is provided on the discharge side of the fixing unit 108, multiple patches or a patch with a long dimension in the conveyance direction of the printing medium are printed, and the heating time is varied among the patches to obtain the change in the specular reflected light intensity with elapse of the heating time.

Figure 10:
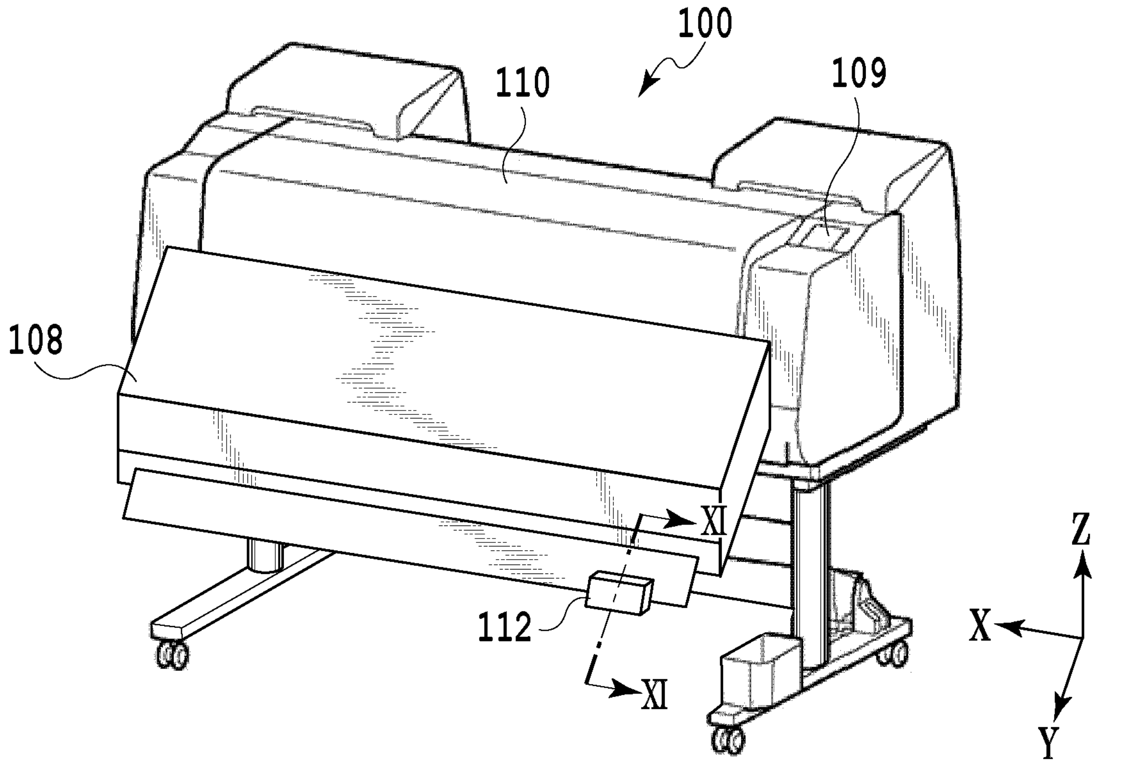
FIG. 10 is a perspective diagram illustrating a configuration of the printing apparatus.

FIG. 10 is a perspective diagram illustrating a configuration of the printing apparatus 100. As illustrated in FIG. 10, in the printing apparatus 100 of the present embodiment, a second optical sensor 112 is provided on the discharge side of the fixing unit 108.

Figure 11:
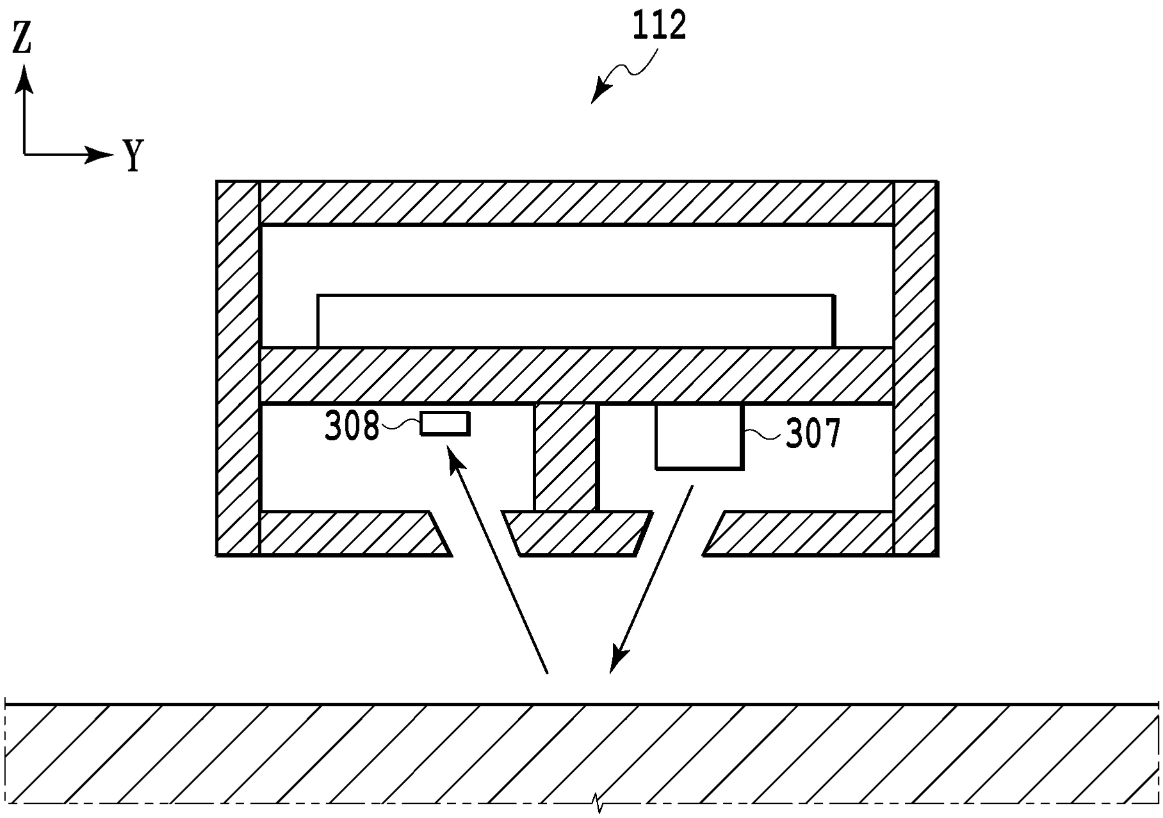
FIG. 11 is a cross-sectional schematic diagram illustrating a configuration of a second optical sensor.

FIG. 11 is a cross-sectional schematic diagram illustrating a configuration of the second optical sensor 112. FIG. 11 illustrates a cross section along the XI-XI line in FIG. 10. The second optical sensor 112 includes a fourth LED 307 and a fourth photodiode 308 as optical elements. The fourth LED 307 is a light source with an angle of irradiation of 60° in the Z direction with respect to the surface (measurement surface) of the printing medium 105. The fourth photodiode 308 receives reflection of light emitted from the fourth LED 307 and reflected on the printing medium 105, at an angle of 60° in the Z direction. Specifically, the fourth LED 307 and the fourth photodiode 308 form an optical system in which the angle of light emission and the angle of light reception are equal and that detects a so-called specular reflection component of the reflected light from the printing medium 105. Although the angle is not limited to 60°, the angle of 60° is preferable in consideration of the size of the second optical sensor 112 and an SN ratio of the received light.

Figure 12:
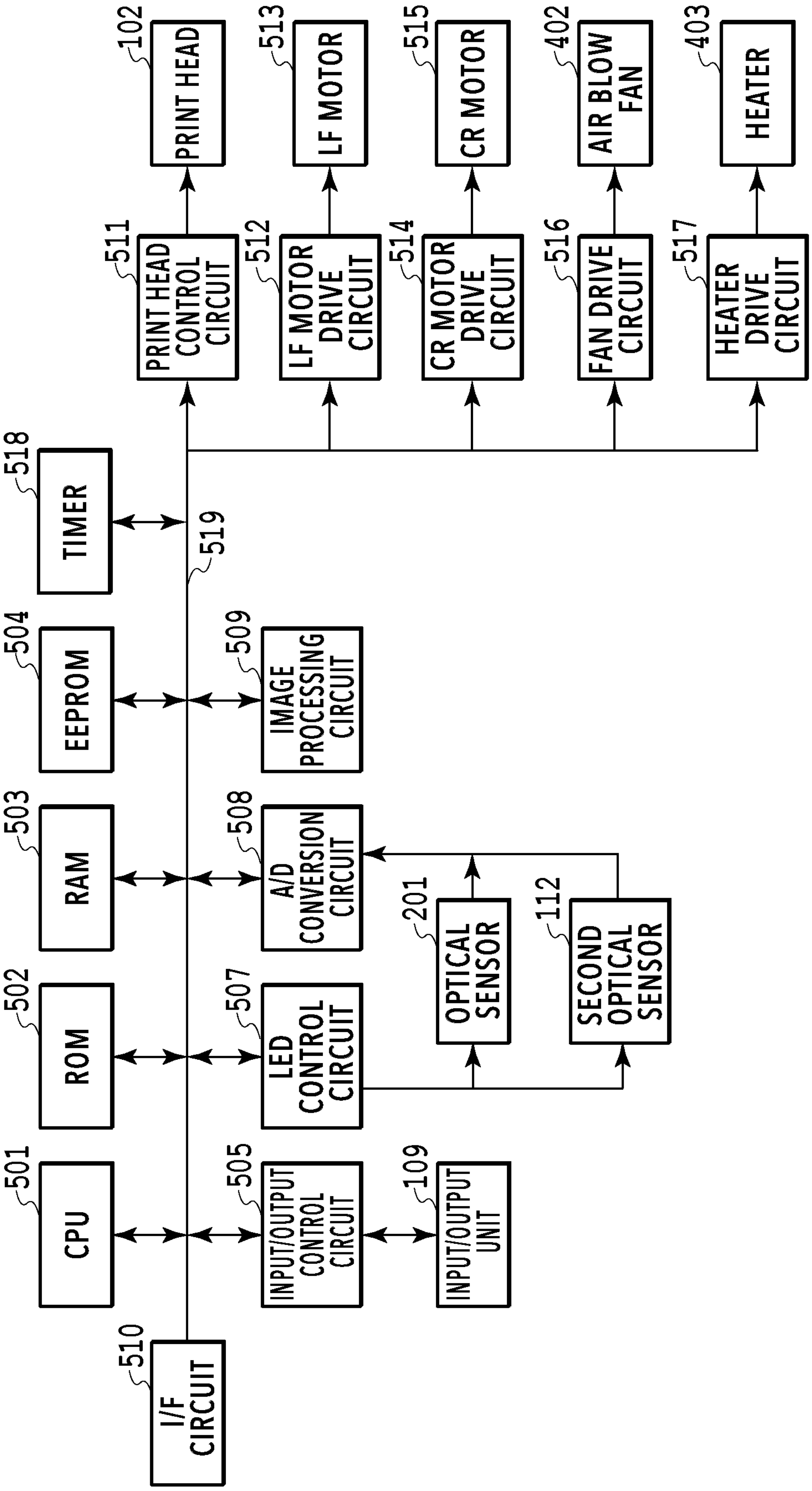
FIG. 12 is a diagram illustrating a block configuration of a control system of the printing apparatus.

FIG. 12 is a diagram illustrating a block configuration of a control system of the printing apparatus 100 in the present embodiment. The basic configuration in FIG. 12 is the same as that in the example illustrated in FIG. 5. The present embodiment is different in that the printing apparatus 100 further includes the second optical sensor 112. Note that, although an example in which the printing apparatus 100 includes the optical sensor 201 (may also be referred to as first optical sensor) and the second optical sensor 112 is described in the present embodiment, a configuration including no optical sensor 201 may be employed.

Figure 13:
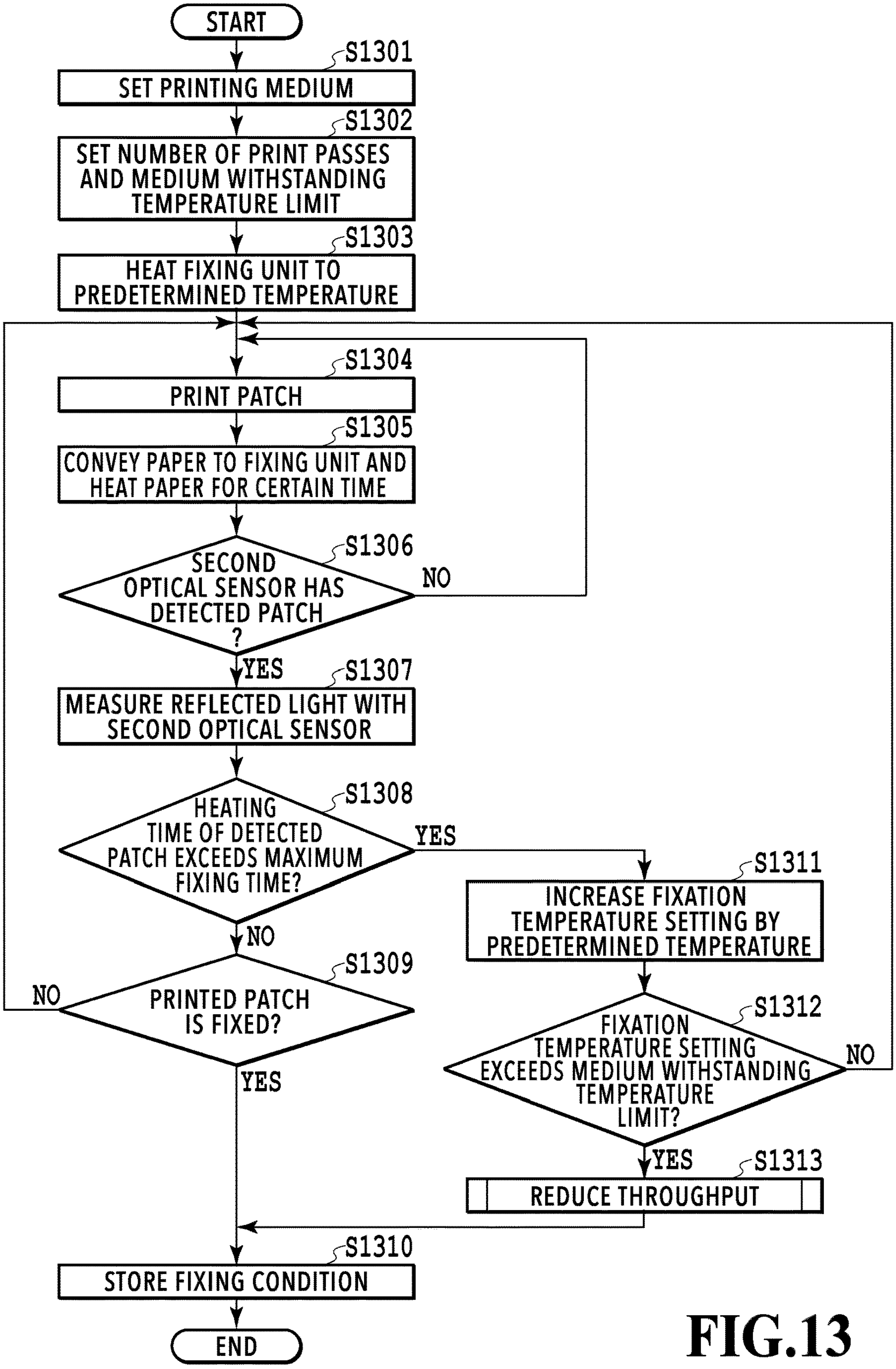
FIG. 13 is a diagram illustrating a flowchart of a process of automatically setting the fixing condition in the present embodiment.

FIG. 13 is a diagram illustrating a flowchart of a process of automatically setting the fixing condition in the present embodiment. The process of FIG. 13 is basically executed in the case where the user adds a type of printing medium to be used in the printing apparatus 100. Specifically, in S1301, the user sets the printing medium 105 in the printing apparatus 100. Then, in S1302, the user sets the number of print passes and the withstanding temperature limit of the printing medium to be added (also referred to as medium withstanding temperature limit), through the input/output unit 109. Then, in the case where the user performs an execution instruction such as pressing of an execution button through the input/output unit 109, the CPU 501 proceeds to processes of S1303 and beyond. The CPU 501 implements the processes illustrated in S1303 and beyond in FIG. 13 by loading a program stored in the ROM 502 onto the RAM 503 and executing the program. Note that some or all of functions of the steps in FIG. 13 may be implemented by hardware such as an ASIC or an electronic circuit.

Since S1303 is the same process as S603, description thereof is omitted. In the case where the fixing unit 108 becomes stable at the desired temperature, the CPU 501 proceeds to S1304 and prints a patch. Then, in S1305, the CPU 501 conveys the printed patch toward the fixing unit 108, and heats the patch for certain time. Note that, although the example in which the patch printed in S1304 is heated in the fixing unit 108 in immediately-subsequent S1305 is illustrated in this example, the configuration is not limited to this. As described later, S1304 to S1306 are a repeated process, and there may be employed a form in which the patch printed in S1304 before immediately-previous S1304 is heated for the first time in current S1305. In other words, in the repeated process executed for the first several times, the heating of the patch does not have to be substantially performed in S1305.

In S1306, the CPU 501 determines whether the second optical sensor 112 has detected the patch. In the case where the second optical sensor 112 has not detected the patch, the CPU 501 returns to S1304 and repeats the patch printing and the heating again. Meanwhile, in the case where the second optical sensor 112 has detected the patch, the CPU 501 proceeds to S1307. As described above, in the present embodiment, one patch is printed on the printing medium 105, and then the printing medium 105 is conveyed to the fixing unit 108 by a conveyance amount corresponding to one patch. Then, a second patch is printed while the first patch is heated in the fixing unit 108 for certain time. Next, the printing medium 105 is conveyed to the fixing unit 108 by the conveyance amount corresponding to one patch again. Then, a third patch is printed while the first and second patches are heated for certain time. Such processes are repeatedly performed.

Figure 15:
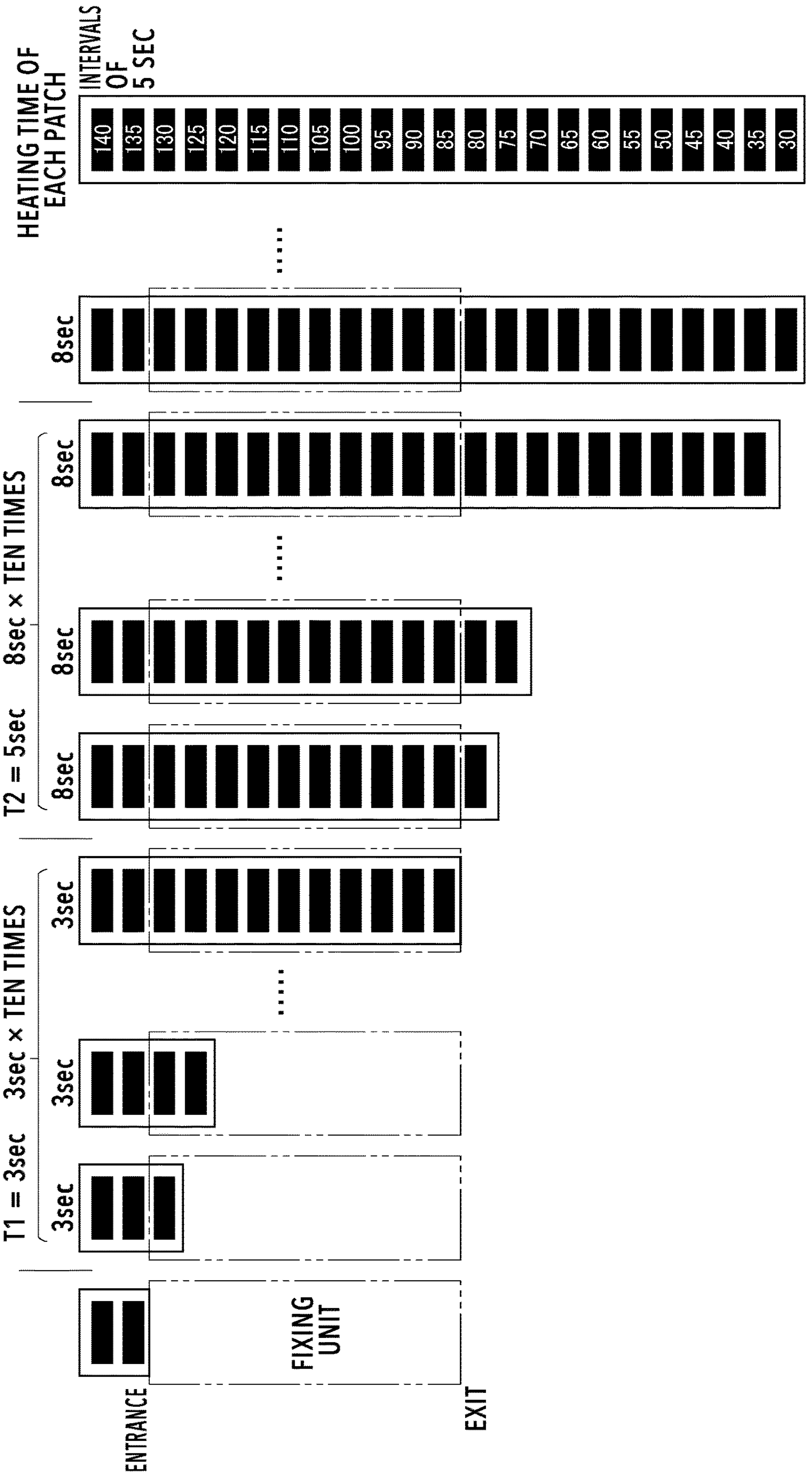
FIG. 15 is a diagram illustrating an outline of a process of detecting fixed states of printed patches.

FIG. 15 is a diagram illustrating an outline of the process of detecting the fixed state of the printed patch. The second optical sensor 112 is arranged downstream of the fixing unit 108 in the conveyance direction of the printing medium 105. As illustrated in FIG. 15, the printing apparatus 100 repeats the process by repeatedly performing the printing and the heating of the patch until the first patch reaches the second optical sensor 112 mounted on the discharge side of the fixing unit 108. In the case where the first patch reaches the second optical sensor 112, in S1307, the CPU 501 measures the specular reflected light intensity by using the second optical sensor 112. Then, the CPU 501 stores the measurement result in the EEPROM 504. Next, in S1308, the CPU 501 determines whether the heating time of the patch detected in S1306 exceeds the maximum fixing time. In the case where the CPU 501 determines that the heating time of the patch detected in S1306 exceeds the maximum fixing time, the CPU 501 proceeds to S1311. In the case where the heating time of the patch detected in S1306 does not exceed the maximum fixing time, the CPU 501 proceeds to S1309. In S1309, the CPU 501 determines whether the patch is fixed, based on the specular reflected light intensity measured in S1307. Note that since an example of the detection of the fixed state from the specular reflected light intensity is the same as that in the example described in the first embodiment, description thereof is omitted. In the case where the CPU 501 determines that the patch is fixed, the CPU 501 proceeds to S1310 and stores the fixing condition. Meanwhile, in the case where the CPU 501 determines that the patch is not fixed, the CPU 501 proceeds to S1304 and repeats the process.

In the present embodiment, time of the heating for certain time performed in S1305 before the reaching of the first patch to the second optical sensor 112 mounted on the discharge side of the fixing unit 108 is varied from that after the reaching. Description is given below by using a specific example. Assume that the patch is heated for T1 [sec] in each conveyance operation until the first patch reaches the second optical sensor 112 mounted on the discharge side of the fixing unit 108. Specifically, the certain time is T1. Moreover, assuming that N conveyance operations are required for the patch to enter the fixing unit 108 and be discharged from (exit) the fixing unit 108, the patch is assumed to be heated for T1+T2 [sec] in each conveyance operation, after execution of N conveyance operations. Thereafter, the above operations are repeated with the heating time in each conveyance operation changed after every N conveyance operations as T1+T2×2 [sec], T1+T2×3 [sec], and so on.

FIG. 15 illustrates an example in which T1=3 sec, T2=5 sec, and N=10 operations as an example. As illustrated in FIG. 15, performing the processes described above creates patches whose heating time is increased from 30 seconds at intervals of 5 seconds. Sequentially measuring the specular reflected light intensities of the respective patches whose heating time is increased as described above enables obtaining of the change in the specular reflected light intensity with lapse of the heating time. In the present example, the minimum heating time is determined by T1, and the resolution of the heating time is determined by T2.

In the case where the specular reflected light intensity of each patch is measured as described above and the fixed state cannot be detected within the maximum fixing time, the CPU 501 increases the fixation temperature setting by predetermined temperature in S1311 as in the first embodiment. Then, in S1312, the CPU 501 determines whether the fixation temperature setting exceeds the medium withstanding temperature limit. In the case where the fixation temperature setting does not exceed the medium withstanding temperature limit, the CPU 501 proceeds to S1304 and newly prints the patch again at increased fixation temperature setting as in the example described in the first embodiment, and a similar measurement process is performed. Note that, in the case where the patch is newly printed at the increased fixation temperature setting, the patch is assumed to be newly printed after all patches printed in the previous temperature setting pass the second optical sensor 112. Moreover, in the case where the CPU 501 determines that the fixation temperature setting exceeds the medium withstanding temperature limit, the CPU 501 proceeds to S1313 and performs a process of reducing the throughput. Details are described later. After S1313, the CPU 501 proceeds to S1310 and stores the fixing condition.

Figure 14:
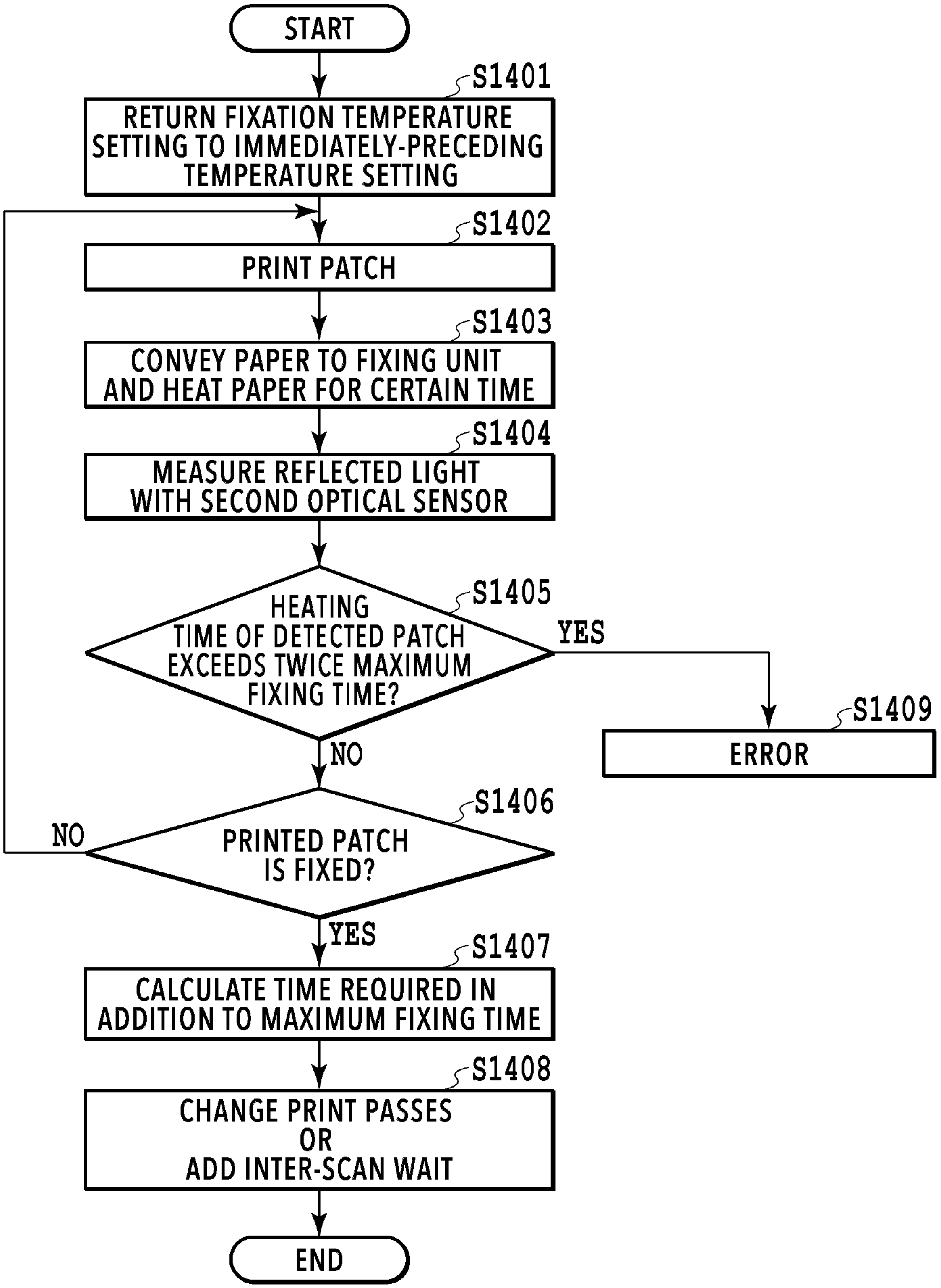
FIG. 14 is a flowchart illustrating details of a process of S1313.

FIG. 14 is a flowchart illustrating details of the process of S1313. The process of FIG. 14 is a process of obtaining time required for fixation at the immediately-previous temperature setting (S1401) as in the example described in the first embodiment. S1402 and S1403 are the same processes as S1304 and S1305. In S1405, the CPU 501 determines whether the accumulated heating time of the detected patch exceeds twice the maximum fixing time. Then, in the case where the accumulated heating time exceeds twice the maximum fixing time, the CPU 501 proceeds to S1409, and terminates the process as an error. Specifically, the CPU 501 determines that the printing medium is a printing medium for which the fixing condition cannot be automatically set. In the case where the accumulated heating time of the detected patch does not exceed twice the maximum fixing time, the CPU 501 proceeds to S1406 and determines whether the patch is fixed. Note that, as in the example described in the first embodiment, twice used in S1405 is merely an example, and the present embodiment is not limited to this.

In the case where the CPU 501 determines that the patch is not fixed in S1406, the CPU 501 returns to S1402 and repeats the process. In this case, a process of increasing the certain time in subsequently-executed S1403 as appropriate after every N conveyance operations is performed as described above. Since processes in S1407 and S1408 in the case where the CPU 501 determines that the patch is fixed in S1406 are the same as the processes described in S708 and S709, description thereof is omitted.

As described above, the fixing condition of the ink to printing media including an unknown printing medium can be appropriately set also in the present embodiment. In the present embodiment, providing the optical sensor (second optical sensor 112) on the discharge side of the fixing unit 108 allows setting of the fixing condition in a heat application method closer to that in actual usage. Accordingly, the fixing condition can be set more accurately than in the first embodiment.

Third Embodiment

The fixing condition set in the first embodiment and the second embodiment is a fixing condition at an environment temperature at a time point where the fixing condition is derived. In the case where the environment temperature greatly changes, the detection of the fixed state needs to be performed again. For example, since a surface temperature of the printing medium can change depending on the environment temperature, the fixing condition also changes correspondingly. In the present embodiment, description is given of an example of setting an appropriate fixing condition without performing the detection of the fixed state again. Note that the environment temperature is a temperature value obtained by a temperature sensor (not-illustrated) included inside the printer, and is assumed to be saved in the EEPROM 504. Since the basic apparatus configuration of the present embodiment is the same as that in the example described in the first embodiment or the second embodiment, description thereof is omitted.

Figure 16:
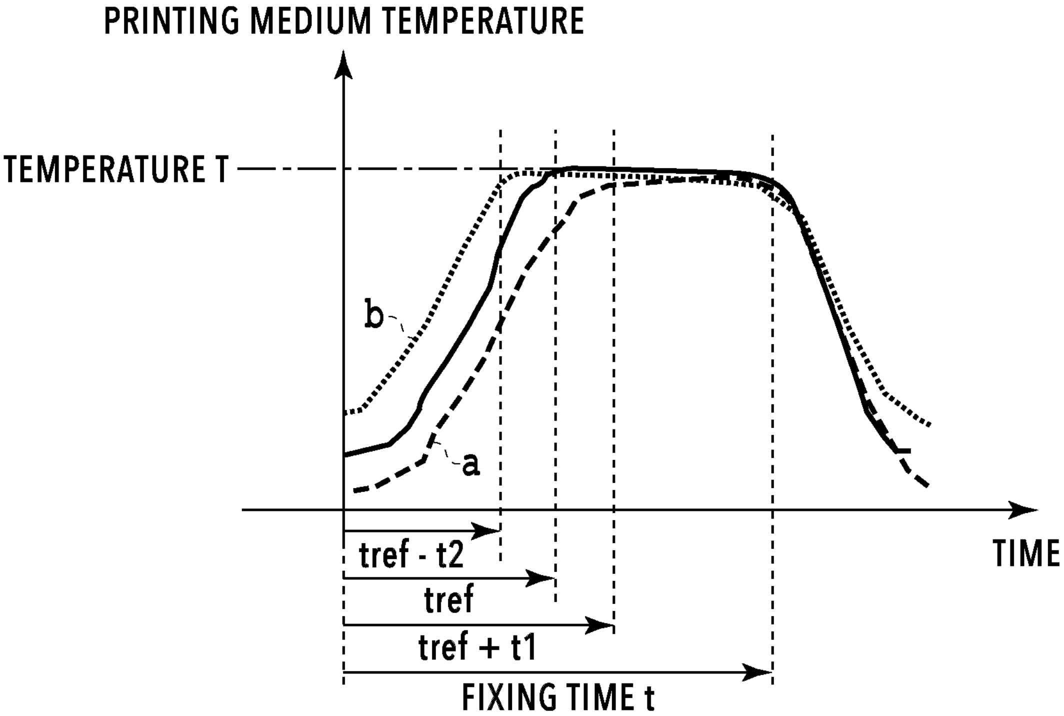
FIG. 16 is a diagram illustrating changes in the fixing condition due to an environment temperature.

FIG. 16 is a diagram illustrating changes in the fixing condition due to the environment temperature. In FIG. 16, the vertical axis represents the printing medium temperature, and the horizontal axis represents time. For example, in the case where the temperature at the time of the detection of the fixed state is 25° C., time required for the printing medium temperature to reach T° C. that is the fixation temperature is tref, and the fixation can be performed within the maximum fixing time t. A relationship between the printing medium temperature and the fixing time in this case is illustrated by the solid line in FIG. 16.

Assume a case where the environment temperature drops and reaches 15° C. In this case, since initial temperature of the printing medium drops, time required for the printing medium temperature to rise to the necessary fixation temperature T° C. increases by t1 (dotted line a in FIG. 16). Accordingly, the heat quantity to a point of lapse of the maximum fixing time t decreases from that in the case where the environment temperature is 25° C., and this may lead to fixation failure. Oppositely, assume a case where the environment temperature rises and reaches 35° C. In this case, since the initial temperature of the printing medium rises, the time required for the printing medium temperature to rise to the necessary fixation temperature T° C. decreases by t2 (dotted line b in FIG. 16). In this case, since the heat quantity to the point of lapse of the maximum fixing time t increases from that in the case where the environment temperature is 25° C., there is a possibility of thermal damage on the printing medium.

One method for solving this problem is executing the process of detecting the fixed state as described above again. However, the fixed state detection process is basically executed in the case where a type of printing medium is to be added, and executing the fixed state detection process every time the environmental temperature changes leads to waste of time, ink, and printing medium. In the present embodiment, the fixation temperature is corrected depending on the environmental temperature to eliminate such waste. Note that a correction value is assumed to be determined for each of environment temperature differences ΔT and stored in advance in the EEPROM 504.

Figure 17:
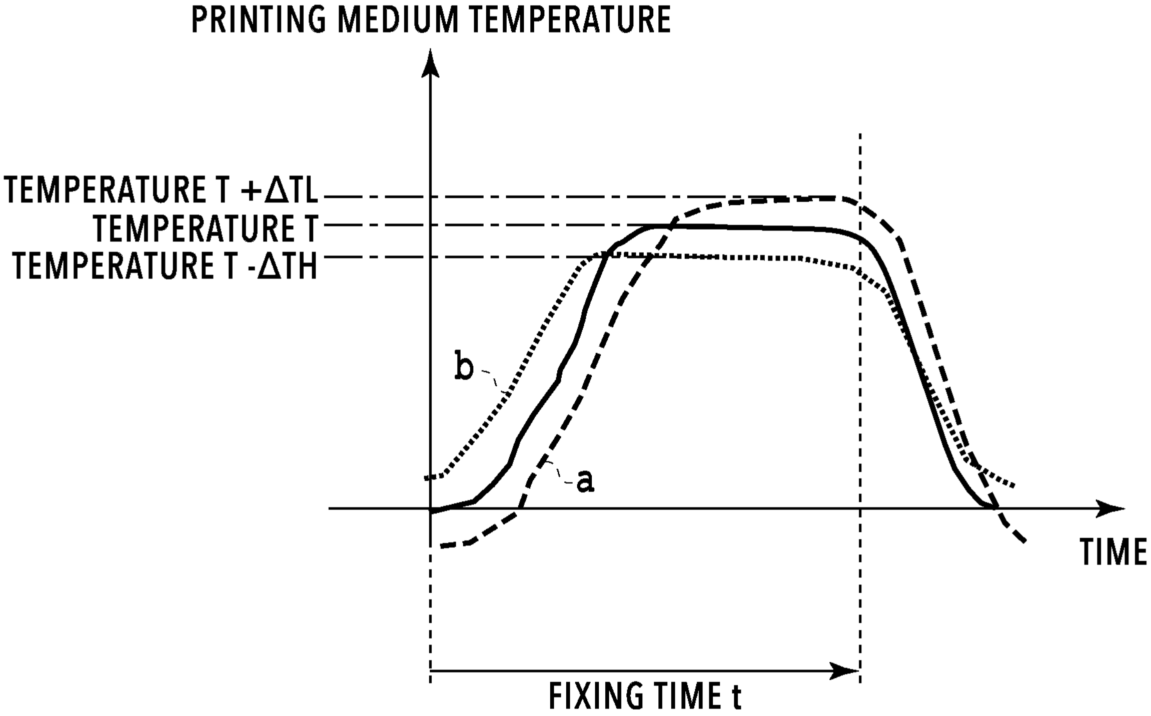
FIG. 17 is a diagram illustrating a relationship of a corrected temperature and a fixing time.

FIG. 17 is a diagram illustrating a relationship of a corrected temperature and a fixing time. Description is given by using a case where the initial environment temperature (environment temperature at time of obtaining the fixation temperature in the fixed state detection process) is 25° C. as an example. In the case where the environment temperature drops by 10° C., the fixation temperature is increased by TL to cause the ink to be fixed within the determined fixing time (dotted line a in FIG. 17). Oppositely, in the case where the environment temperature rises by 10° C., the fixation temperature is reduced by TH to cause the ink to be fixed within the determined fixing time while suppressing damage to the printing medium (dotted line b in FIG. 17).

Figure 18:
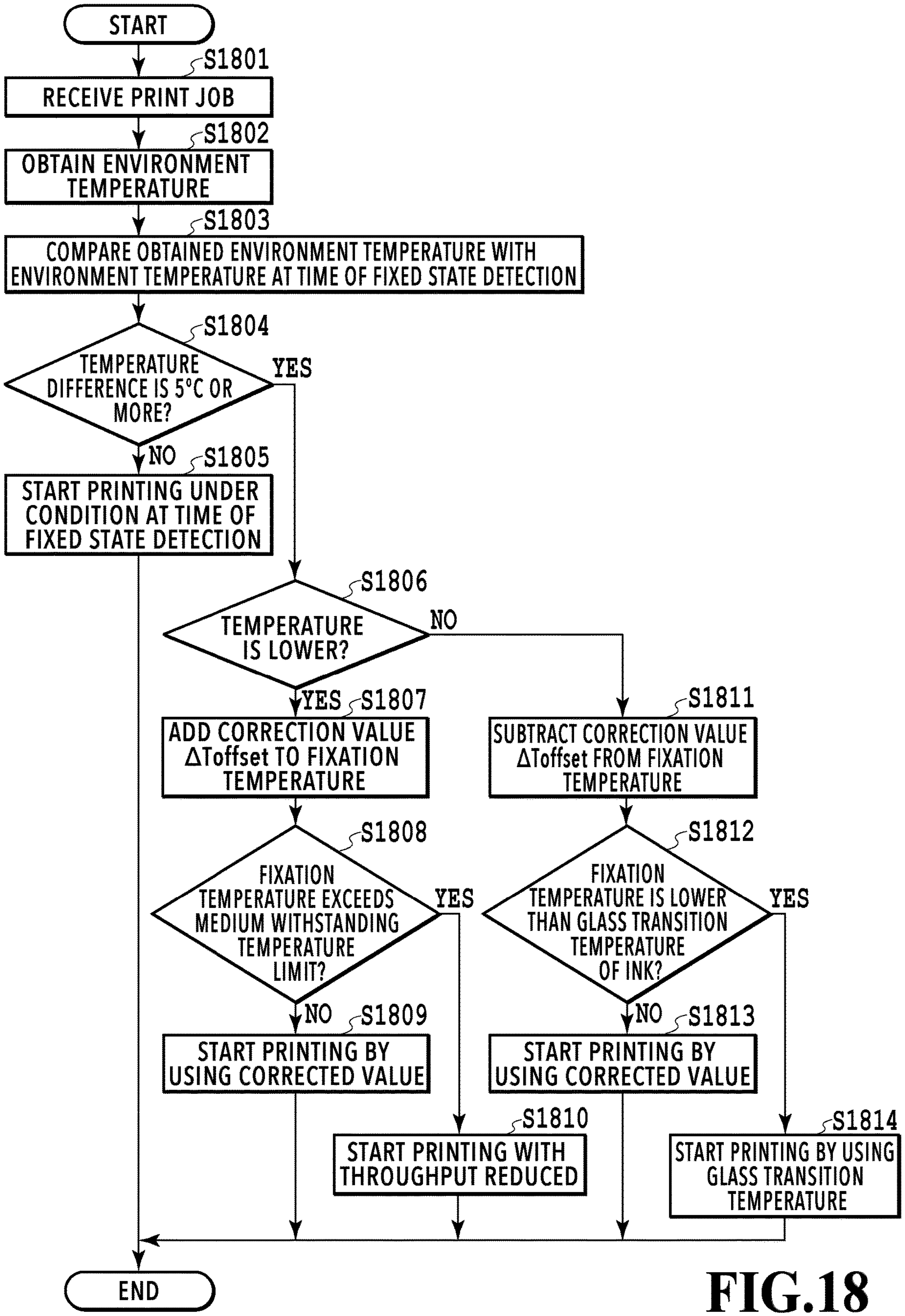
FIG. 18 is a diagram illustrating a flowchart in which a correction process is executed.

FIG. 18 is a diagram illustrating a flowchart in which the above correction process is executed. FIG. 18 is a flowchart performed in the case where the printing apparatus 100 is in a state where it can receive a print job such as a printing standby state. FIG. 19 is a diagram illustrating examples of the correction values. The correction values used in the process of FIG. 18 are assumed to be set at intervals of 5° C. and stored in the EEPROM 504 as illustrated in FIG. 19.

The CPU 501 implements the process illustrated in FIG. 18 by loading a program stored in the ROM 502 onto the RAM 503 and executing the program. Note that some or all of functions of the steps in FIG. 18 may be implemented by hardware such as an ASIC or an electronic circuit.

In S1801, the CPU 501 receives a print job. In S1802, the CPU 501 obtains the environment temperature. In S1803, the CPU 501 compares the environment temperature stored in the EEPROM 504 at time of the fixed state detection and the environment temperature obtained in S1802. In S1804, the CPU 501 determines whether or not a difference between the temperatures compared in S1803 is 5° C. or more. Although 5° C. that is a value of the 5° C. intervals defined in FIG. 19 is given as an example of a predetermined difference in the present embodiment, this is merely an example and the predetermined difference is not limited to this.

In the case where there is no temperature difference of 5° C. or more, the CPU 501 proceeds to S1805 and starts the printing under the fixing condition at time of the fixed state detection stored in the EEPROM 504. Then, the CPU 501 terminates the process of FIG. 18.

Meanwhile, in the case where the temperature difference is 5° C. or more, the CPU 501 proceeds to S1806 to perform correction. In S1806, the CPU 501 determines whether or not the environment temperature obtained in S1802 is lower than that at time of the fixed state detection. In the case where the environment temperature is lower than that at time of the fixed state detection, the CPU 501 proceeds to S1807. In S1807, the CPU 501 refers to the table of FIG. 19 and adds a correction value ΔToffset corresponding to the temperature difference, to the fixation temperature in the fixing condition stored in the EEPROM 504. Next, in S1808, the CPU 501 determines whether or not the fixation temperature being the result of addition in S1807 exceeds the medium withstanding temperature limit. In the case where the CPU 501 determines that the fixation temperature exceeds the medium withstanding temperature limit, the CPU 501 proceeds to S1810. In S1810, the CPU 501 starts printing with the throughput reduced. Specifically, in the case where the fixation temperature exceeds the medium withstanding temperature limit, there is a possibility of occurrence of damage to the printing medium. Accordingly, the process at the fixation temperature to which the correction value is added is not performed (that is the correction value is not added to the temperature in S1807), and the throughput is reduced by provision of wait time or the like. Note that the throughput in this case is (fixation temperature at time of fixed state detection-environment temperature at time of printing)/(fixation temperature at time of fixed state detection-environment temperature at time of fixed state detection)× throughput before correction, and is calculated by the CPU 501.

In the case where the CPU 501 determines that the fixation temperature being the result of addition in S1807 does not exceed the medium withstanding temperature limit in S1808, the printing is started at this corrected fixation temperature.

In the case where the CPU 501 determines that the environment temperature obtained in S1802 is higher than that at time of the fixed state detection in S1806, the CPU 501 proceeds to S1811. In S1811, the CPU 501 refers to the table of FIG. 19, and subtracts the correction value ΔToffset corresponding to the temperature difference, from the fixation temperature. Next, in S1812, the CPU 501 determines whether the fixation temperature being the result of subtraction in S1811 is lower than a glass transition temperature of the ink. In the case where the fixation temperature is lower than the glass transition temperature of the ink, there is a possibility that the temperature is too low and the ink cannot be fixed. Accordingly, in the case where the fixation temperature is lower than the glass transition temperature, in S1814, the CPU 501 starts printing with the glass transition temperature of the ink being a lower limit. Meanwhile, in the case where the fixation temperature is not lower than the glass transition temperature of the ink, in S1813, the CPU 501 starts printing by using the corrected fixation temperature.

As described above, according to the present embodiment, the fixation temperature is corrected by using the difference between the environment temperature at time of the fixed state detection and the environment temperature at time of the printing, and the optimal fixing condition can be thereby calculated also in different environments. Accordingly, fixing failure and damage to the printing medium can be suppressed.

Fourth Embodiment

In the case where the fixing condition is set in the first embodiment or the second embodiment, there is a possibility that the required fixing condition changes as the print process is continued. For example, in the case where age deterioration or abnormality in the heater of the fixing unit 108 occurs, the fixed state is insufficient under the set fixing condition, and an image is not correctly printed in some cases. In the present embodiment, description is given of an example in which a detection patch is printed between print pages and the reflected light intensity of the detection patch after the fixation is compared with the reflected light intensity in the fixing condition setting to detect a change of the fixing condition and in which the user is prompted to perform the automatic setting process of the fixing condition. Since the basic configuration of the present embodiment is the same as the configuration described in the second embodiment, description thereof is omitted.

Figure 20:
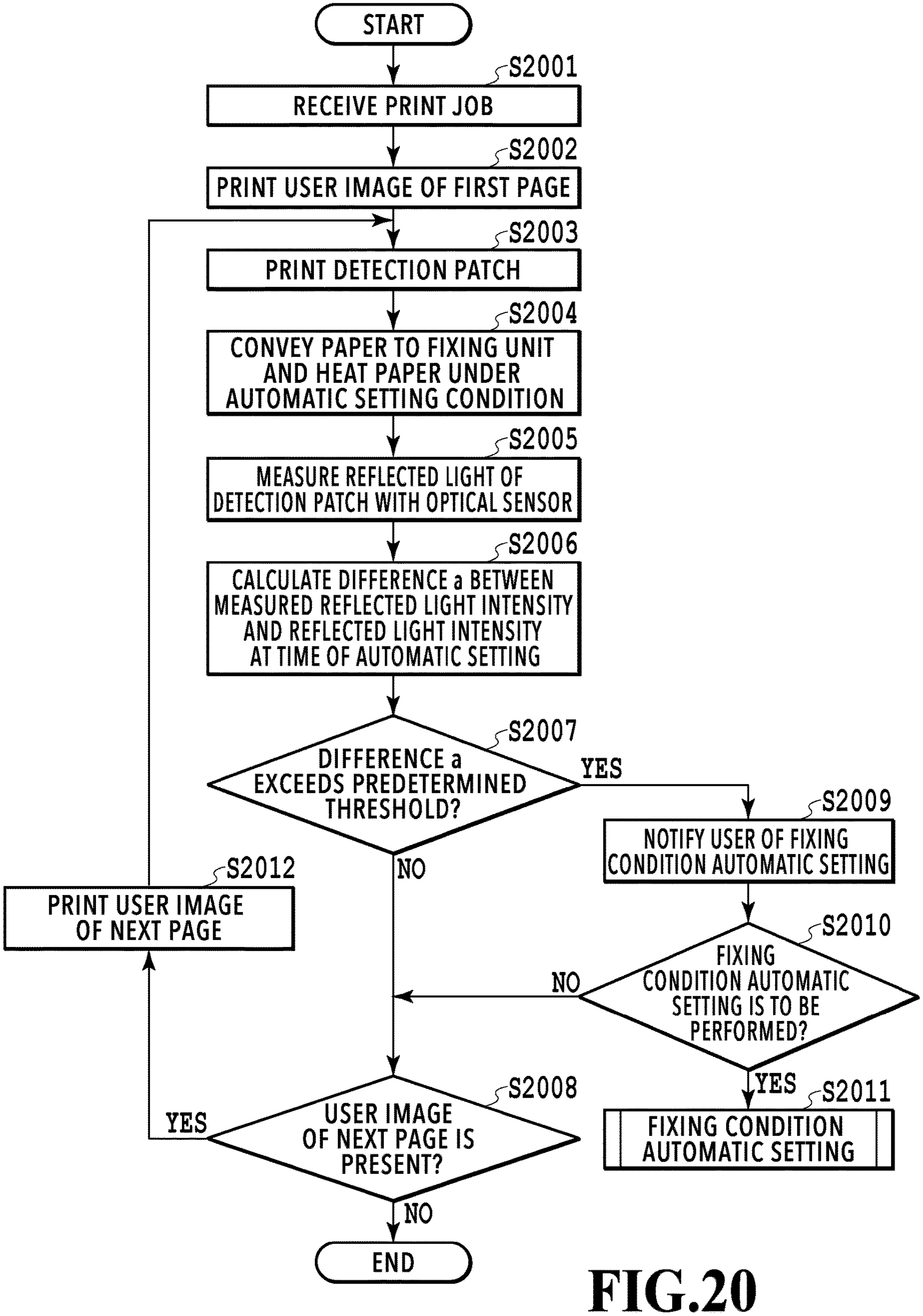
FIG. 20 is diagram illustrating a flowchart of a process of detecting a change of the fixing condition.

FIG. 20 is diagram illustrating a flowchart of a process of detecting the change of the fixing condition in the present embodiment. FIG. 20 is a flowchart performed in the case where the printing apparatus 100 is in a state where it can receive a print job such as a printing standby state. The CPU 501 implements the process illustrated in FIG. 20 by loading a program stored in the ROM 502 onto the RAM 503 and executing the program. Note that some or all of functions of the steps in FIG. 20 may be implemented by hardware such as an ASIC or an electronic circuit.

In S2001, the CPU 501 receives a print job through an operation for the input/output unit 109. In S2002, the CPU 501 prints a user image of a first page specified by the print job. Next, in S2003, the CPU 501 prints a detection patch for detecting the fixing condition change at a predetermined ink applying amount. In this case, a patch of an applying amount at the maximum printing duty printable by the printing apparatus 100 is assumed to be printed.

Figure 21A:
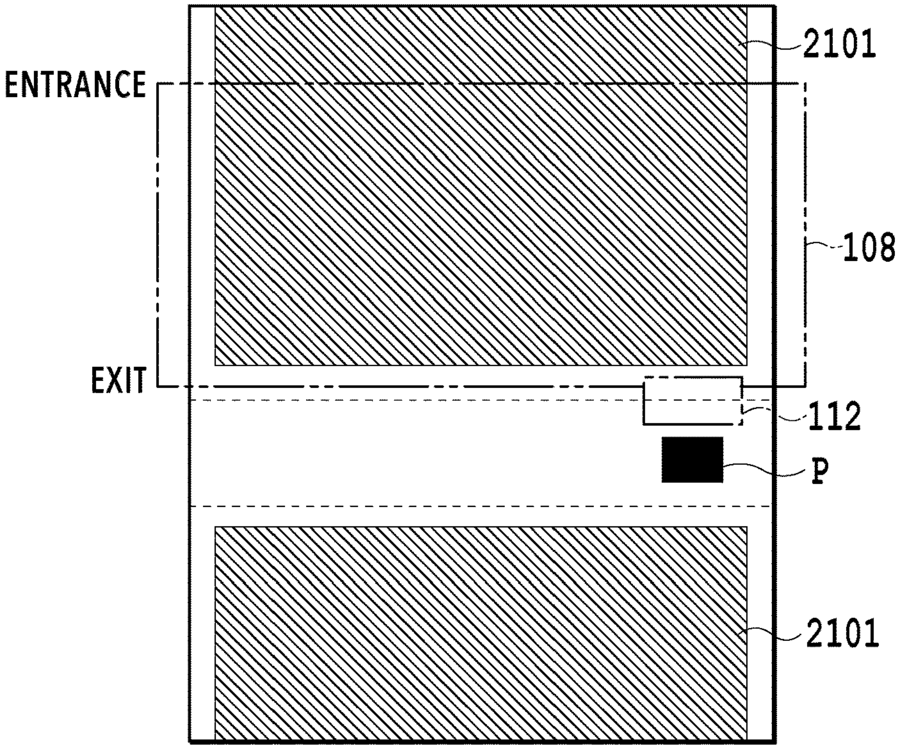
FIGS. 21A and 21B are diagrams explaining an example of a detection patch P.
Figure 21B:
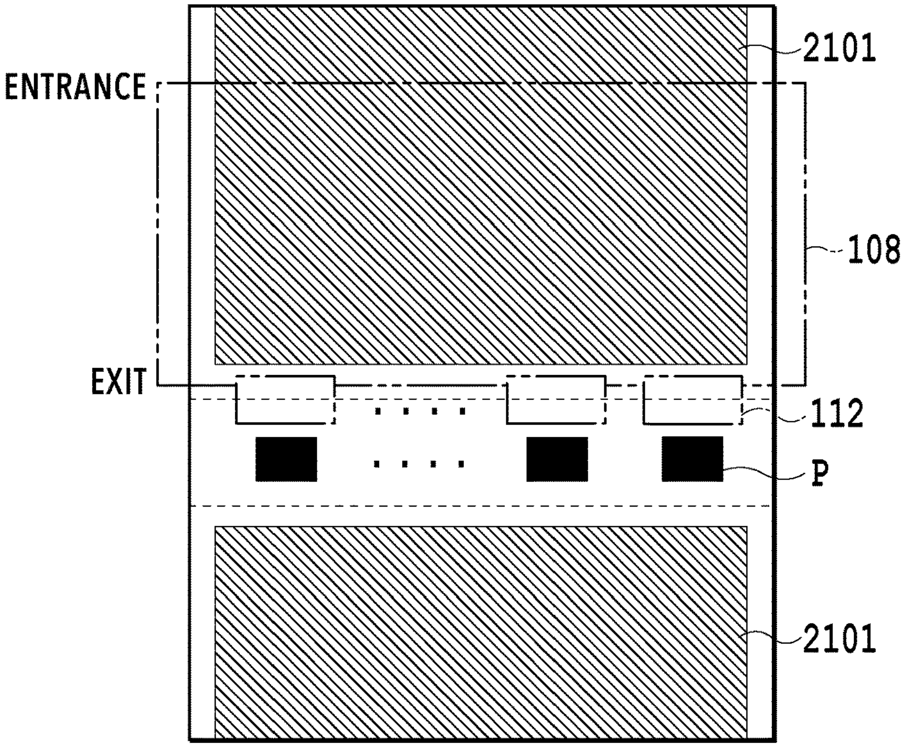

FIGS. 21A and 21B are diagrams explaining examples of a detection patch P. A user image 2101 on the lower side of the sheet surface is assumed to be the user image of the first page. FIGS. 21A and 21B illustrates a state where, after the printing of the user image 2101 of the first page, the detection patch P is printed, the reflected light intensity of the detection patch P is measured with the second optical sensor 112, and a user image 2101 of the next page subsequently enters the fixing unit 108. FIG. 21A illustrates an example in which there is one detection patch P. FIG. 21B illustrates an example in which there are multiple detection patches P. As illustrated in FIG. 21B, multiple detection patches P may be printed in the movement direction of the carriage 101. For example, in the case where the heater of the fixing unit 108 is divided into multiple heaters, the detection patch may be printed for each heater. FIG. 21B illustrates an example in which multiple second optical sensors 112 are also provided on the discharge side of the fixing unit 108.

Explanation continues by returning to FIG. 20. In S2004, the CPU 501 conveys the printing medium on which the user images 2101 and the detection patch P are printed to the fixing unit 108, and heats the printing medium under the fixing condition set in the fixing condition setting process described in the first embodiment or the second embodiment. Then, in S2005, the CPU 501 measures the specular reflected light intensity on the detection patch with the second optical sensor 112. Next, in S2006, the CPU 501 calculates a difference a between the specular reflected light intensity measured in S2005 and the specular reflected light intensity stored together with the fixing condition in the EEPROM 504 in the storing of the fixing condition. Then, in S2007, the CPU 501 determines whether the difference a exceeds a predetermined threshold. In the case where the CPU 501 determines that the difference a exceeds the predetermined threshold, the CPU 501 proceeds to S2009. In the case where the CPU 501 determines that the difference a does not exceed the predetermined threshold, the CPU 501 proceeds to S2008. As described above, since there is a case where a relationship of the specular reflected light intensities in the non-fixed state and the fixed state is reverse, for example, the CPU 501 may determine whether an absolute value of the difference exceeds the predetermined threshold.

In the case where the CPU 501 determines that the difference a exceeds the predetermined threshold in S2007, the CPU 501 determines that the fixing condition has changed due to aging or abnormality of the heater. Accordingly, in S2009, the CPU 501 gives notification prompting the automatic setting of the fixing condition, to the user. In the case where the CPU 501 receives an instruction to perform the automatic setting of the fixing condition in S2010, the CPU 501 proceeds to S2011 and transitions to the process illustrated in FIG. 6 or 13. Specifically, a process of resetting the fixing condition is performed. Meanwhile, in the case where the CPU 501 receives no instruction of performing the automatic setting of the fixing condition, the CPU 501 proceeds to S2008.

In S2008, the CPU 501 determines whether there is a user image of the next page. In the case where there is the user image of the next page, the CPU 501 proceeds to S2012 and performs printing of the user image of the next page. Then, the CPU 501 proceeds to S2003 and repeats the process again. Meanwhile, in the case where there is no user image of the next page, the CPU 501 terminates the process of the flowchart of FIG. 20.

Figure 22:
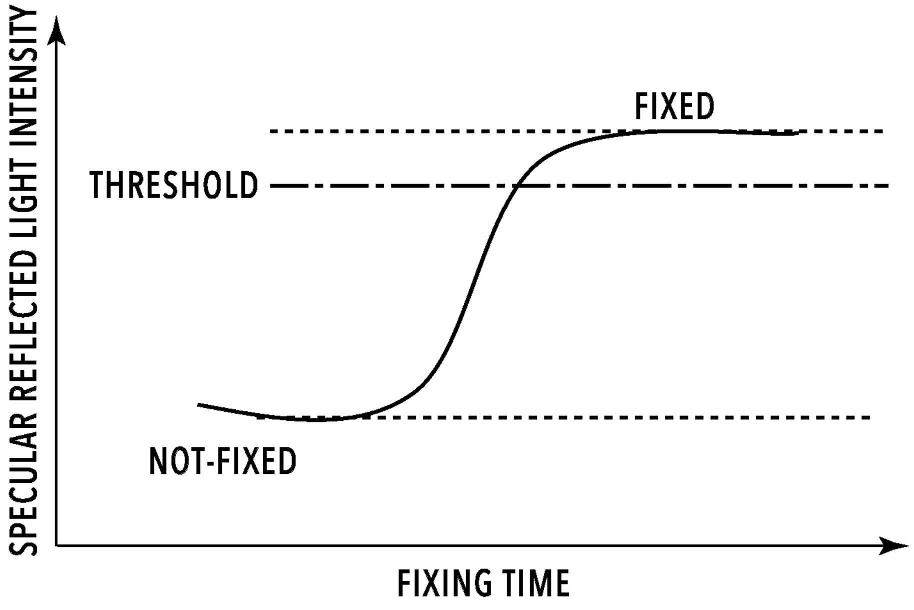
FIG. 22 is a diagram explaining a process of detecting the fixed state from a specular reflected light intensity.

FIG. 22 is a diagram explaining a process of detecting the fixed state from the specular reflected light intensity. The vertical axis of FIG. 22 represents the specular reflected light intensity, and the horizontal axis represents the fixing time. FIG. 22 illustrates an example of the printing medium whose specular reflected light intensity in the case where the patch is not fixed is lower than the specular reflected light intensity in the case where the patch is fixed. In FIG. 22, the process may be as follows. The specular reflected light intensity stored in the EEPROM 504 together with the fixing condition in the storing of the fixing condition is reduced by a predetermined amount, and the resultant value is set as a threshold. In the case where the measured specular reflected light intensity on the detection patch is lower than the threshold, the CPU 501 determines that the patch is not fixed. Specifically, the process of S2007 may be a process that proceeds to S2009 if the measured specular reflected light intensity on the detection patch is lower than the threshold and that proceeds to S2008 if not.

Note that, although the example of printing the detection patch P for every page is described in the present embodiment, the detection patch P may be printed for every several pages. It is only necessary to regularly measure the reflected light intensity by using the detection patch.

As described above, according to the present embodiment, it is possible to detect the change in the fixing condition due to aging or abnormality of the heater and prompt the automatic setting of the fixing condition.

Fifth Embodiment

The examples of appropriately setting the fixing condition of the ink to the printing medium have been described above. In some cases, quality required for an outputted product printed on the printing medium varies depending on the user. For example, one user may request printing in highest image quality by optimizing the fixing condition while another user may request printing to be performed immediately. In the present embodiment, description is given of an example in which the appropriate fixing condition is set depending on quality required by the user. Specifically, in the present embodiment, description is given of an example in which selection from the user is received and a setting mode is switched depending on the selection. Since the basic configuration of the present embodiment is the same as the example described in the first embodiment, differences are mainly described.

<Selection of Fixing Condition Setting Flow>

Figure 23:
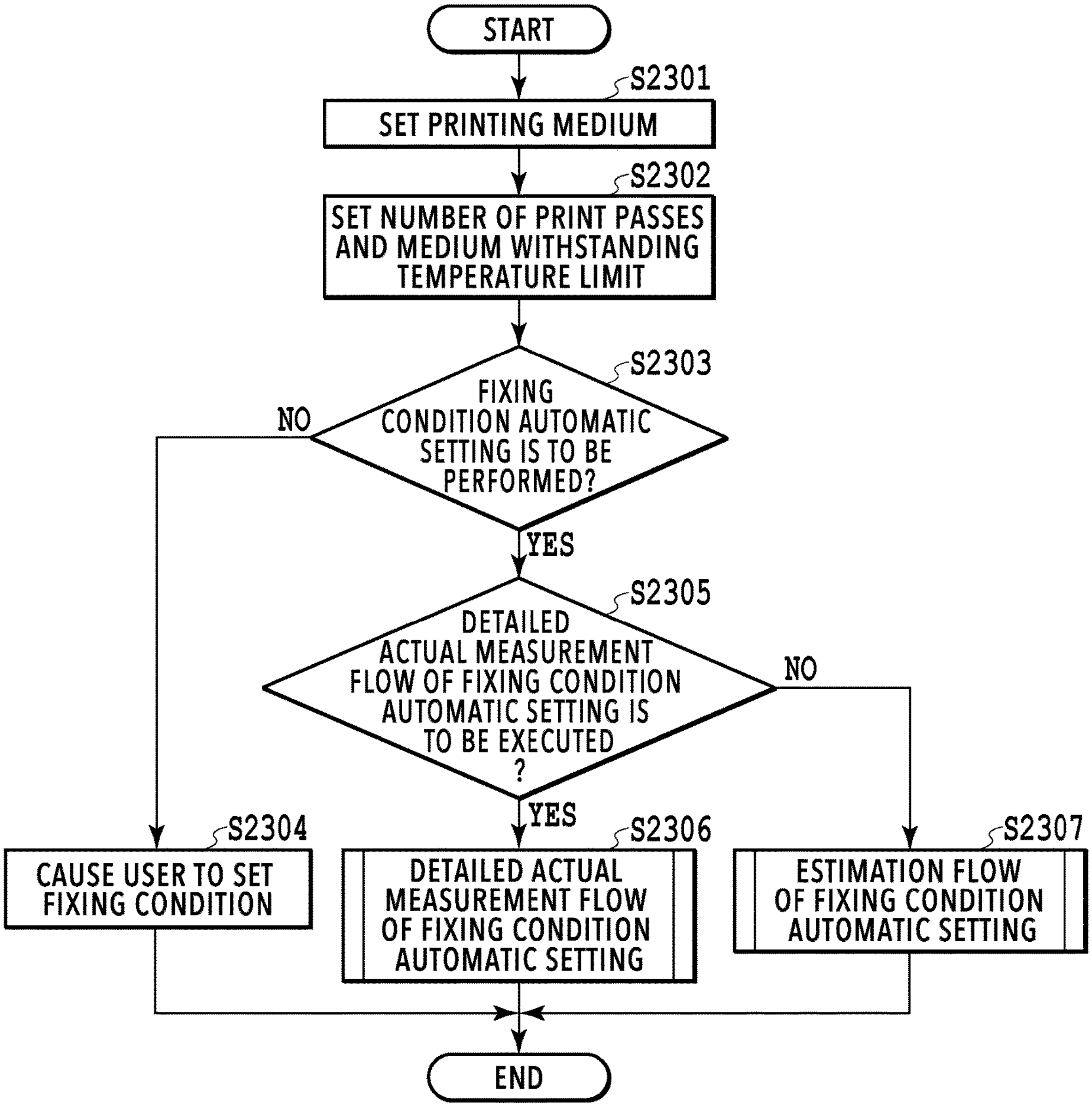
FIG. 23 is a diagram illustrating a process in which a user selects the fixing condition setting flow.

FIG. 23 is a diagram illustrating a process in which the user selects the fixing condition setting flow in the present embodiment. The process of FIG. 23 is basically executed in the case where the user adds a type of printing medium to be used in the printing apparatus 100. Specifically, in S2301, the user sets the printing medium 105 in the printing apparatus 100. Then, in S2302, the user sets the number of print passes and the withstanding temperature limit of the printing medium to be added (medium withstanding temperature limit), through the input/output unit 109. Then, in the case where the user performs the execution instruction through the input/output unit 109, the CPU 501 proceeds to processes of S2303 and beyond. The CPU 501 implements the processes illustrated in S2303 and beyond in FIG. 23 by loading a program stored in the ROM 502 onto the RAM 503 and executing the program. Note that some or all of functions of the steps in FIG. 23 may be implemented by hardware such as an ASIC or an electronic circuit.

In S2303, the CPU 501 receives selection of whether to perform the automatic setting of the fixing condition from the user. For example, the CPU 501 displays a message inquiring whether to perform the automatic setting of the fixing condition on the input/output unit 109, and receives a selection input for this inquiry from the user. In the case where the user determines that the automatic setting of the fixing condition is not to be performed, the CPU 501 proceeds to S2304. S2304 is a process of a setting mode in which the user performs manual input to set the fixing condition. In S2304, the CPU 501 receives setting of the fixing condition made by the user. For example, the CPU 501 receives a fixing condition such as the fixation temperature and the air blow amount via the input/output unit 109, sets the fixing condition, and terminates the process of the flowchart of FIG. 23.

In the case where the CPU 501 receives selection of performing the automatic setting of the fixing condition from the user in S2303, the CPU 501 proceeds to S2305. In S2305, the CPU 501 determines whether to execute an "estimation flow of fixing condition automatic setting" in which the fixing condition is estimated and set or a "detailed actual measurement flow of fixing condition automatic setting" in which the fixed state is actually measured in detail to set the fixing condition. This determination is performed based on the user selection. For example, the user may select the flow to be performed at the point of S2303, or the user selection may be received again at the point of S2305 through the input/output unit 109. In the case where execution of the "detailed actual measurement flow of fixing condition automatic setting" is determined in S2305, the CPU 501 proceeds to S2306. In S2306, the "detailed actual measurement flow of fixing condition automatic setting" is executed. Upon completion of the process, the CPU 501 terminates the process of the flowchart illustrated in FIG. 23. Meanwhile, in the case where execution of the "estimation flow of fixing condition automatic setting" is determined, the CPU 501 proceeds to S2307. In S2307, the "estimation flow of fixing condition automatic setting" is executed. Upon completion of the process, the CPU 501 terminates the process of the flowchart illustrated in FIG. 23.

The "detailed actual measurement flow of fixing condition automatic setting" of S2036 is the same process as the process described in the flowchart of FIG. 6 in the first embodiment. In the detailed actual measurement flow of fixing condition automatic setting, the fixed state detection is performed with the temperature being gradually adjusted from the minimum temperature required for the fixation of the ink and with the number of passes and the like also being adjusted to define the optimal heating temperature and the throughput. Accordingly, the processing time for obtaining the optimal fixing condition is long. Meanwhile, the optimal fixing condition that prevents damage such as stretching and shirking of the printing medium can be set. Accordingly, this setting mode is a setting mode in which an output product with high image quality can be obtained (also referred to as first mode).

<Estimation Flow of Fixing Condition Automatic Setting>

Figure 24:
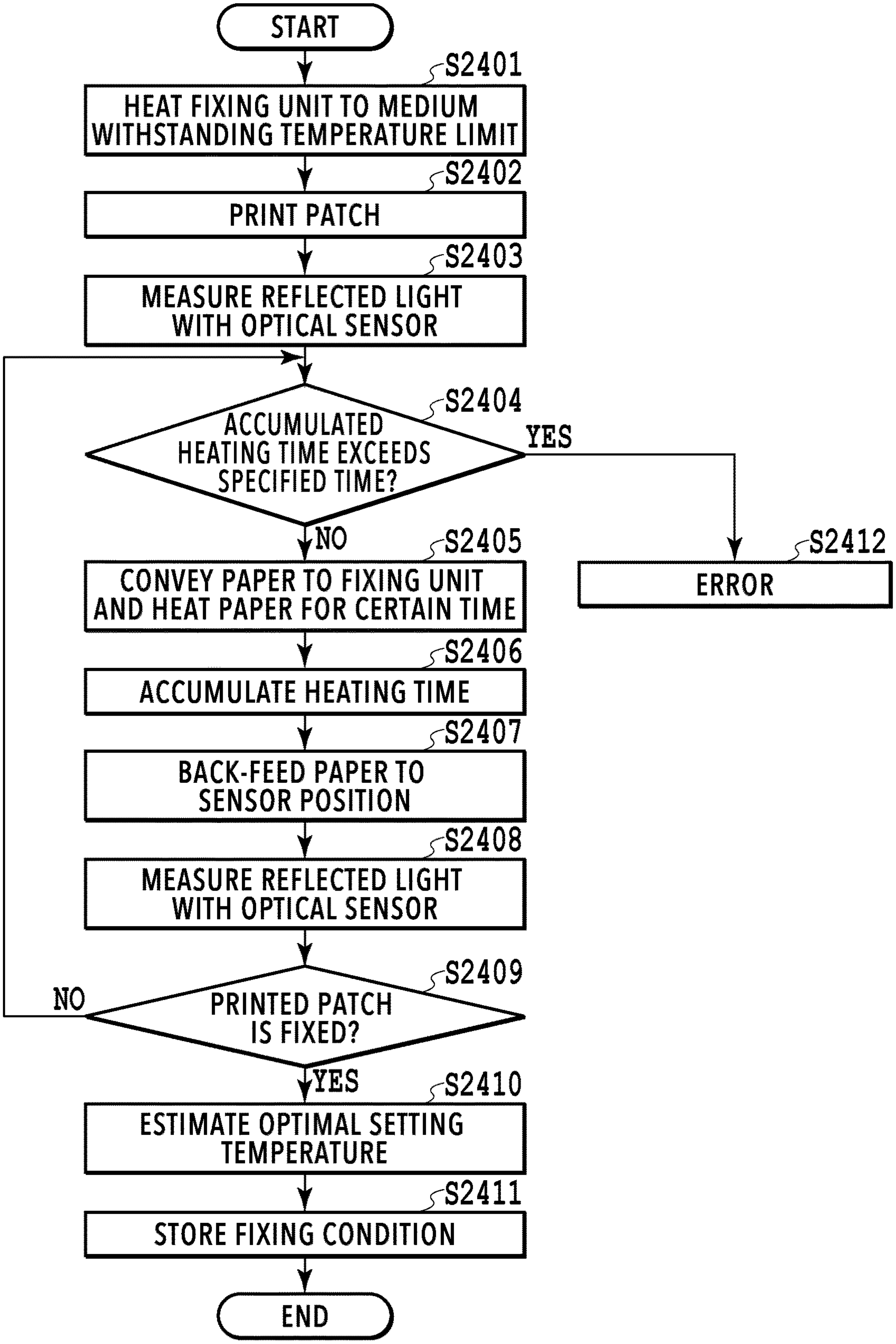
FIG. 24 is a diagram illustrating an example of a process of an estimation flow of fixing condition automatic setting.

FIG. 24 is a diagram illustrating an example of a process of the estimation flow of fixing condition automatic setting in S2307. In S2401, the CPU 501 heats the fixing unit 108 to the withstanding temperature limit of the set printing medium 105, and sets the fixing unit 108 to a stable temperature state. The withstanding temperature limit of the printing medium may be any of the withstanding temperature limits of the respective printing media stored in the printing apparatus 100 in advance. Alternatively, the withstanding temperature limit set in S2302 may be used. In the case where the temperature of the fixing unit 108 enters the stable state, in S2402, the CPU 501 prints a patch for fixed state detection. S2402 to S2409 are substantially the same as S604 to S611 described in FIG. 6. However, S2404 is different from S606.

In S2404, the CPU 501 determines whether the accumulated heating time exceeds specified time. In the case where the CPU 501 determines that the accumulated heating time does not exceed the specified time, the CPU 501 proceeds to S2405. In the case where the CPU 501 determines that the accumulated heating time exceeds the specified time, the CPU 501 proceeds to S2412. In S2412, the CPU 501 determines that the printing medium is a printing medium for which the fixing condition automatic setting cannot be executed, makes determination of error, and terminates the process of FIG. 24. The specified time is assumed to be defined as follows, though it depends on the characteristics of the printing medium, the number of passes that can be set in the printing apparatus 100, and the speed at which the carriage can be move. Specifically, the maximum heating time as the fixing unit 108 is calculated from the number of passes that can be set in the printing apparatus 100 and the speed at which the carriage can be move, and the calculated maximum heating time is set as the specified time.

In the case where the fixation is detected in S2409, in subsequent S2410, the CPU 501 estimates an optimal setting temperature. A method of estimating the optimal setting temperature is described later. In the case where the estimation of the optimal setting temperature is completed, in S2411, the CPU 501 stores information on the optimal setting temperature in the EEPROM 504 as the fixing condition.

In the estimation flow of fixing condition automatic setting, the fixing condition detection is performed at the medium withstanding temperature limit (printing medium withstanding temperature limit), and the heating temperature and the throughput are defined and set through estimation from the result of the detection. Since the heating temperature and the throughput are defined only through estimation, there is a possibility of medium damage such as expansion and contraction occurring at a certain level. Meanwhile, the process time of the fixed state detection for deriving the fixing condition is short, and the user can immediately proceed to desired printing. Accordingly, this setting mode is a setting mode in which productivity can be improved (also referred to as second mode).

<Method of Estimating Optimal Setting Temperature>

Figure 25A:
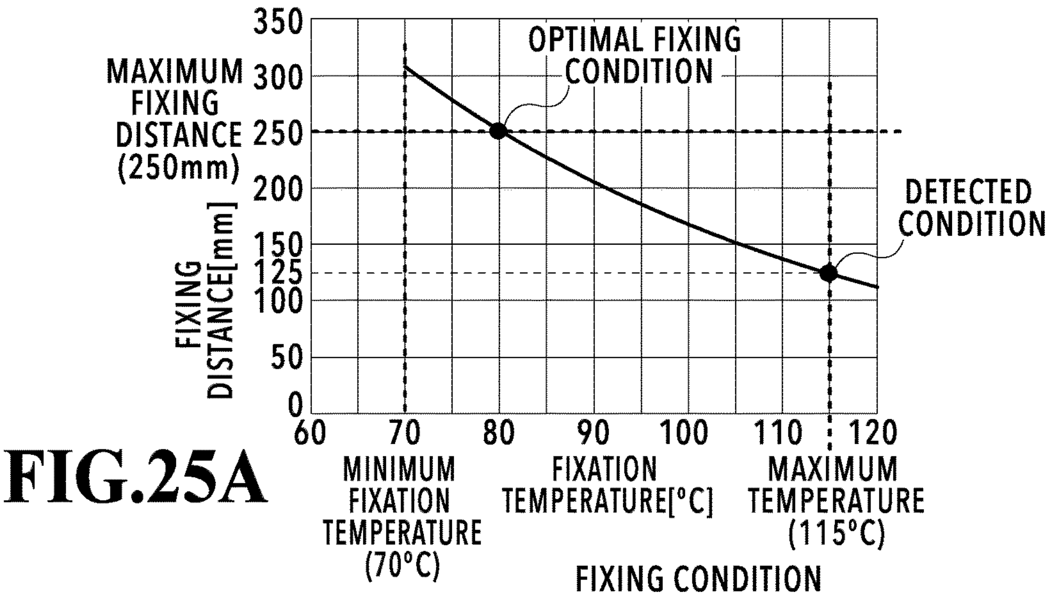
FIGS. 25A to 25C are diagrams illustrating relationships between a fixation temperature and a fixing distance of the printing medium.
Figure 25B:
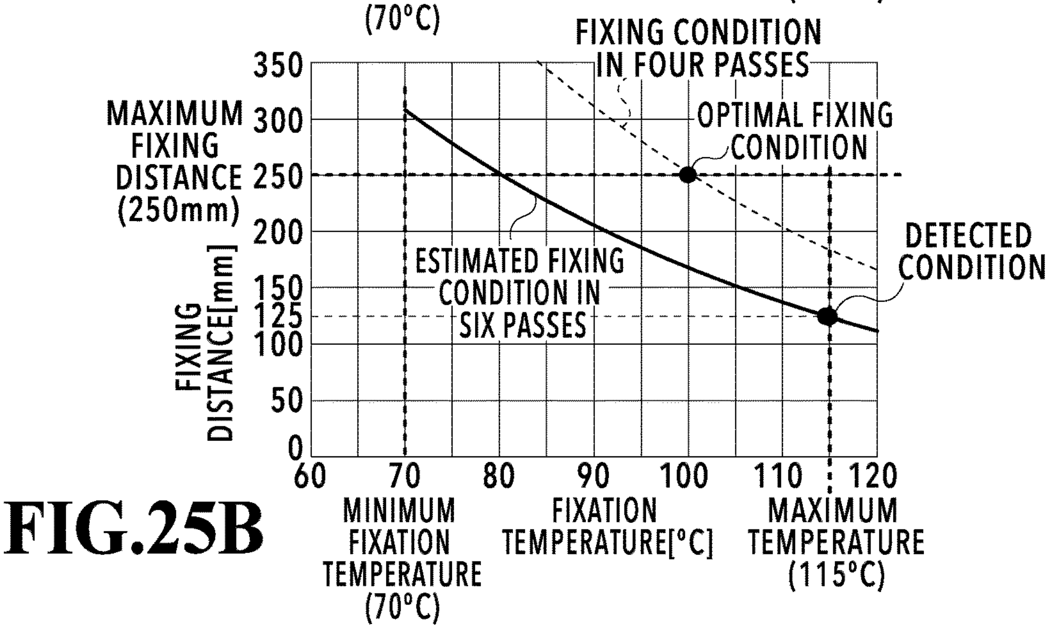
Figure 25C:
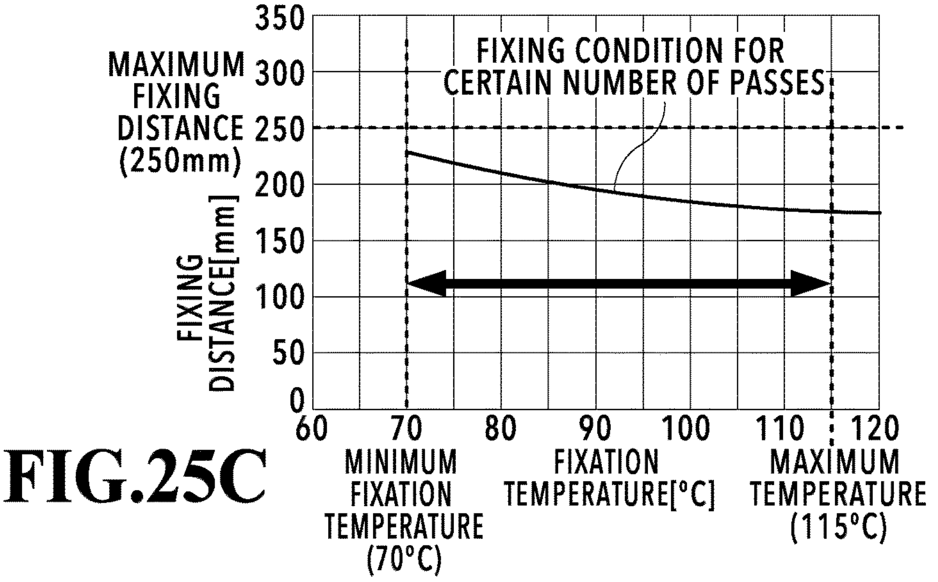

FIGS. 25A to 25C are diagrams illustrating a relationship between fixation temperature and a fixing distance of a certain printing medium. The method of estimating the optimal setting temperature executed in S2410 is described by using FIGS. 25A to 25C. The printing apparatus is assumed to store and hold a fixation temperature distance table illustrating a relationship as illustrated in FIGS. 25A to 25C for each printing medium in the EEPROM 504 or like. The fixation temperature distance table is illustrated as a graph in each of FIGS. 25A to 25C. The fixing distance is a distance for which the printing medium is conveyed in the fixing unit. Note that, although the fixing distance in the case where the conveyance speed is constant is used as an example in this description, the fixation temperature may be used instead of the fixing distance.

As an example, description is given of the following example case. The fixed state detection in the estimation flow of fixing condition automatic setting is performed for a certain printing medium, fixation is detected in S2409 at fixation temperature of 115° C. and a fixing distance of 125 mm, and a condition in this fixation is set as the fixing condition. Note that the fixing distance of 125 mm is a distance obtained from a relationship between the accumulated heating time obtained in S2406 and the conveyance speed of the paper based on the number of print passes. For example, in the case where the conveyance speed of the paper is 4.17 mm/sec and the accumulated heating time is 30 sec, the fixing distance is obtained by multiplying these values, and is substantially 125 mm.

The CPU 501 compares the fixing condition derived by the detection as described above and each of the fixation temperature distance tables for multiple printing media stored in the printing apparatus, and finds a fixing condition of a printing medium with the closest characteristics. Then, the CPU 501 refers to the fixation temperature distance table of the printing medium with the closest characteristics. For example, assume that, in this example, the fixation temperature distance table illustrated in FIG. 25A is the fixation temperature distance table to be referred to as the table of the printing medium with the closest characteristics to the characteristics of the printing medium detected in this fixed state detection. Specifically, the CPU 501 finds the black circle (detected condition) in FIG. 25A based on the detected condition (fixation temperature 115° C., fixing distance 125 mm). The CPU 501 finds a table (graph) that passes this black circle (detected condition) or a portion near the black circle. The table (graph) illustrated in FIG. 25A is a table thus found.

In the present embodiment, the maximum fixing distance of the fixing unit 108 of the printing apparatus 100 is assumed to be 250 mm. Note that this value is a value for explanation, and is different from the maximum fixing distance described in the first embodiment. Assuming that the maximum fixing distance of the fixing unit 108 in the present embodiment is 250 mm, a condition in which the fixing distance is more than 250 mm cannot be selected. Moreover, the maximum heating temperature that can be set is the lower one of the withstanding temperature limit of the printing medium and the maximum temperature to which the fixing unit 108 can be set. In this example, it is assumed that the withstanding temperature limit of the printing medium is lower than the maximum temperature to which the fixing unit 108 can be set, and is 115° C. Moreover, the fixation temperature needs to be equal to or higher than the minimum fixation temperature (70° C. in FIG. 25A) of the ink. Based on these conditions, setting of 80° C. is obtained as the optimal fixing condition (fixation temperature) in the example of FIG. 25A. Specifically, a temperature corresponding to the black circle (optimal fixing condition) intersecting the maximum fixing distance (250 mm) in the fixation temperature distance table found by using the detected condition as in FIG. 25A is determined as the fixation temperature. As a reason for performing such determination, there is a premise that the longer the fixing distance is, the better it is. As a result of the above determination, the printed image is discharged from the fixing unit 108 in the state where the printed image has been continuously subjected to the fixing process at the fixation temperature in the fixing unit from one end portion to the other end portion of the fixing unit. If the fixation temperature is set to about 90° C. (in FIG. 25A, the fixing distance corresponding to this temperature is about 200 mm), the image is fixed more than necessary for 50 mm. In this case, the printing medium or the printed image is affected or energy is inefficiently used in the fixing unit 108. Accordingly, the fixation temperature corresponding to the maximum fixing distance is determined as the optimal fixing condition.

Another example is described by using FIG. 25B. This example is an example in the case where the number of print passes set by the user in S2302 is different from the number of print passes used in the determination of the fixation in the estimation flow of fixing condition automatic setting in FIG. 24. A fixation temperature distance table corresponding to the number of print passes set by the user in S2302 is sometimes not stored in the printing apparatus 100. For example, in some cases, a fixation temperature distance table for a print condition of six passes is stored in the printing apparatus 100, but a table for the case where the number of print passes set in S2302 is four passes is not stored in the printing apparatus 100. In this case, the CPU 501 performs the estimation flow of fixing condition automatic setting in FIG. 24 for the number of print passes corresponding to the stored fixation temperature distance table.

This process is specifically described. In the present example, assume that the fixed state detection is performed for the print condition of six passes in execution of the estimation flow of fixing condition automatic setting for a certain printing medium, and as a result, the fixation temperature of 115° C. and the fixing distance of 125 mm are obtained as the fixing condition. As in the example described above, there is performed a process of finding a fixing condition of a printing medium with the closest characteristics by using the obtained fixing condition and the multiple fixation temperature distance tables stored in the printing apparatus 100. In this example, the fixation temperature distance table for the printing condition of six passes illustrated by the solid line in FIG. 25B is assumed to correspond to the printing medium with the closest characteristics. Assuming that the maximum fixing distance of the fixing unit 108 in the printing apparatus 100 is 250 mm, a condition in which the fixing distance is more than 250 mm cannot be selected. Moreover, in the present example, the set withstanding temperature limit of the printing medium is assumed to be 115° C. The fixing condition needs to be set within a range in which the fixing distance of fixing the ink does not exceed the maximum fixing distance of the fixing unit 108 within the above conditions. Assuming that the print condition selected by the user in S2302 is four passes, the fixing condition for four passes needs to be estimated. The solid line in FIG. 25B is the fixation temperature distance table for six passes while the broken line in FIG. 25B is a fixation temperature distance table for four passes. In the case where the printing apparatus 100 only has a fixation temperature distance table for a representative number of passes, a method of calculating the fixation temperature distance table from the fixation temperature distance table for the representative number of passes is performed. In the present example, assume that the fixation temperature distance table for six passes is the fixation temperature distance table for the representative number of passes, and the printing apparatus does not have the fixation temperature distance table for four passes. In this case, the fixation temperature distance table for four passes is calculated from the fixation temperature distance table for six passes, and the characteristics of the broken line in FIG. 25B illustrate values of this calculated fixation temperature distance table. The fixing distance in the case of four passes needs to be 1.5 times that in the case of six passes, under the same fixation temperature condition. The CPU 501 moves the table (graph) for six passes that passes the black circle (detected condition), to a position where the fixing distance becomes 1.5 times the original. Then, a point where the moved graph meets the maximum fixing distance is determined as the optimal fixing condition for four passes. The fact that setting of 100° C. is the optimal fixing condition for four passes is obtained from the broken line of FIG. 25B being the fixation temperature distance table for four passes.

Note that, in the case where the fixation temperature distance table for four passes is stored in the EEPROM 504 or the like of the printing apparatus, this table may be used.

In the present example, description is given of the example in which the fixation temperature distance table for six passes is assumed to be held in advance as the fixation temperature distance table of the representative number of passes. In the case where the fixation temperature distance table for the representative number of passes is held as the fixation temperature distance table, it is preferable to hold a fixation temperature distance table for the number of passes in which a distance at which the ink can be fixed is equal to or smaller than the maximum fixing distance of the fixing unit 108 in the range from the minimum fixation temperature to the withstanding temperature limit of the printing medium. FIG. 25C illustrates the fixing condition for a certain number of passes. In the fixing condition for this number of passes, the fixing condition is equal to or smaller than the maximum fixing distance in a range from the minimum fixation temperature to the maximum temperature. The printing apparatus preferably holds the fixing condition of the number of passes as described above as the fixation temperature distance table of the representative number of passes. Specifically, the printing apparatus preferably holds the fixation temperature distance table in which the fixing condition is within a range settable as an apparatus. In the case where the fixation temperature distance table is to be found for the first time, the maximum temperature sometimes cannot be set as the fixation temperature depending on conditions. For example, the printing medium can only handle temperature up to 100° C. in some cases, or temperature of 100° C. or more causes a large amount of damage to the printing medium in some cases. Moreover, the fixation temperature to be used in finding of the fixation temperature distance table for the first time is unknown. Accordingly, using the fixation temperature distance table in which the fixing condition is within the settable range as much as possible makes it easier to find the fixation temperature distance table for each printing medium in the determination performed in the finding of the fixation temperature distance table for the each printing medium for the first time. Thus, the printing apparatus preferably holds the fixation temperature distance table as illustrated in FIG. 25C.

As described above, according to the present embodiment, an appropriate fixing condition can be set depending the quality required by the user. For example, the printing apparatus is configured such that a user who desires to maintain highest image quality can select the detailed actual measurement flow of fixing condition automatic setting. Meanwhile, the printing apparatus is configured such that a user who allows a certain level of decrease in image quality and who desires to quickly complete the process of fixing condition automatic setting and immediately obtain an outputted product can select the estimation flow of fixing condition automatic setting. Accordingly, it is possible to set appropriate fixing condition depending on desired quality and requests of the user.

Sixth Embodiment

In the fifth embodiment description is given of the example in which whether to perform the detail actual measurement flow or estimation flow of fixing condition automatic setting is selected in S2305, and one of the detailed actual measurement flow of fixing condition automatic setting or the estimation flow of fixing condition automatic setting is performed depending on the selection result. In the present embodiment, description is given of an example in which the estimation flow of fixing condition automatic setting is performed first at a point where the execution of the fixing condition automatic setting is selected, and then the detailed actual measurement flow of fixing condition automatic setting is performed by using the result of the estimation flow. A basic configuration is the same as that of the fifth embodiment, and differences are mainly described below.

<Selection of Fixing Condition Setting Flow>

Figure 26:
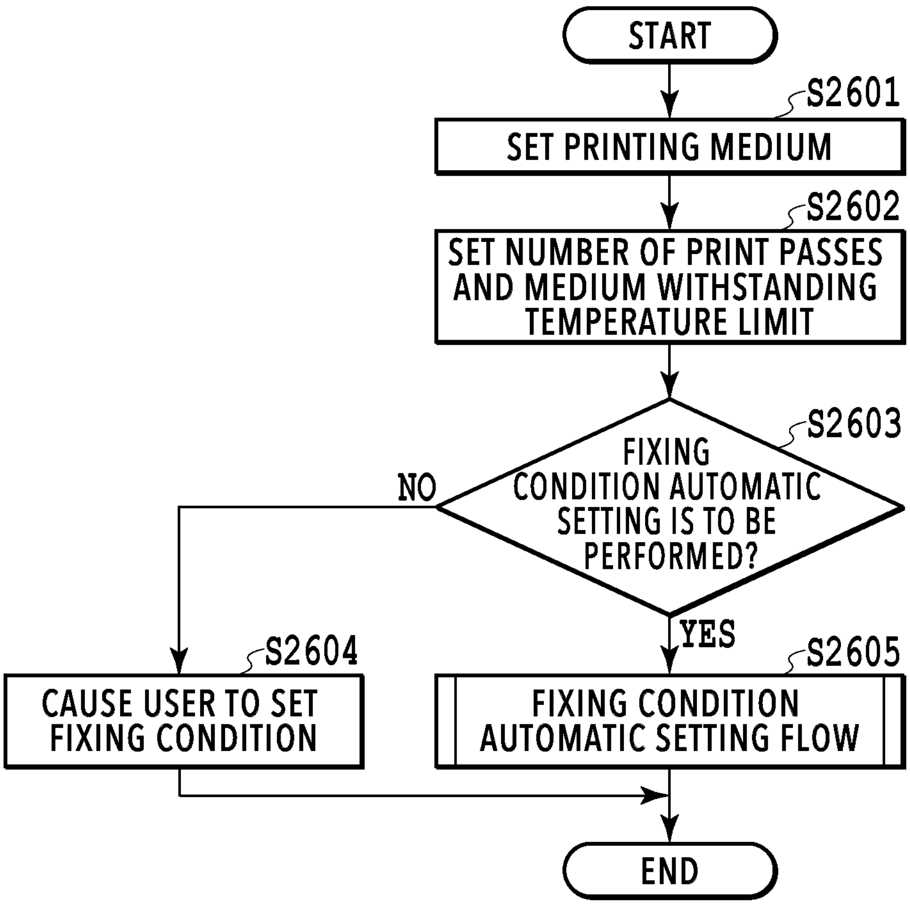
FIG. 26 is a diagram illustrating a process in which a user selects a fixing condition setting flow.

FIG. 26 is a diagram illustrating a process in which the user selects the fixing condition setting flow in the present embodiment. The process of FIG. 26 is basically executed in the case where the user adds a type of printing medium to be used in the printing apparatus 100. Specifically, in S2601, the user sets the printing medium 105 in the printing apparatus 100. Then, in S2602, the user sets the number of print passes and the withstanding temperature limit of the printing medium to be added (medium withstanding temperature limit), through the input/output unit 109. Then, in the case where the user performs the execution instruction through the input/output unit 109, the CPU 501 proceeds to processes of S2603 and beyond. The CPU 501 implements the processes illustrated in S2603 and beyond in FIG. 26 by loading a program stored in the ROM 502 onto the RAM 503 and executing the program. Note that some or all of functions of the steps in FIG. 26 may be implemented by hardware such as an ASIC or an electronic circuit.

In S2603, the CPU 501 receives selection of whether to perform the automatic setting of the fixing condition from the user. For example, the CPU 501 displays a message inquiring whether to perform the automatic setting of the fixing condition on the input/output unit 109, and receives a selection input for this inquiry from the user. In the case where the user determines that the automatic setting of the fixing condition is not to be performed, the CPU 501 proceeds to S2604. In S2604, the CPU 501 receives setting of the fixing condition made by the user. For example, the CPU 501 receives a fixing condition such as the fixation temperature and the air blow amount via the input/output unit 109, sets the fixing condition, and terminates the process of the flowchart of FIG. 26.

In the case where the CPU 501 receives selection of performing the automatic setting of the fixing condition from the user in S2603, the CPU 501 proceeds to S2605. In S2605, the CPU 501 performs a fixing condition automatic setting flow. Details are described later. In the case where the fixing condition automatic setting flow is completed, the CPU 501 terminates the process of the flowchart of FIG. 26.

<Fixing Condition Automatic Setting Flow>

Figure 27:
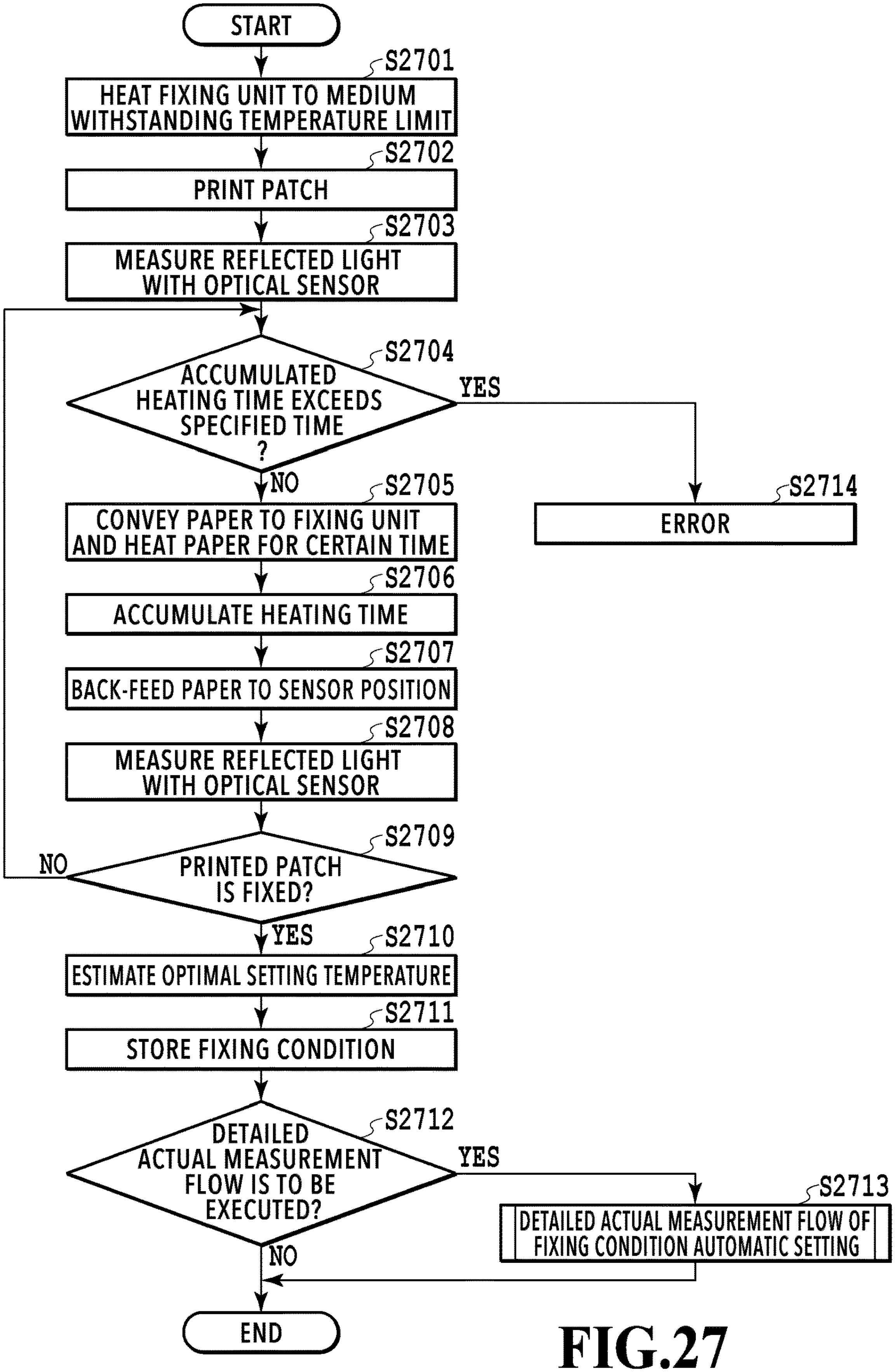
FIG. 27 is a diagram illustrating a fixing condition automatic setting flow.

FIG. 27 is a diagram illustrating the fixing condition automatic setting flow in S2605. In the case where the CPU 501 proceeds to the fixing condition automatic setting flow, the same process as the estimation flow of fixing condition automatic setting in the fifth embodiment is executed. Processes of S2701 to S2711 are the same processes as the processes of S2401 to S2411. In the case where the process of storing the fixing condition in S2711 is completed, the CPU 501 then proceeds to S2712.

In S2712, the CPU 501 determines whether the detailed actual measurement flow is to be executed. For example, the CPU 501 causes the user to select whether to execute the detailed actual measurement flow of fixing condition automatic setting through the input/output unit 109, and receives the selection. In the case where non-execution of the detailed actual measurement flow of fixing condition automatic setting is selected, the CPU 501 determines that the fixing condition is the fixing condition obtained in the estimation flow of fixing condition automatic setting and stored in S2711, and terminates the process of the flowchart of FIG. 27. Meanwhile, in the case where execution of the detailed actual measurement flow of fixing condition automatic setting is selected in S2712, the CPU 501 proceeds to S2713 and moves to the detailed actual measurement flow of fixing condition automatic setting.

<Detailed Actual Measurement Flow of Fixing Condition Automatic Setting>

Figure 28:
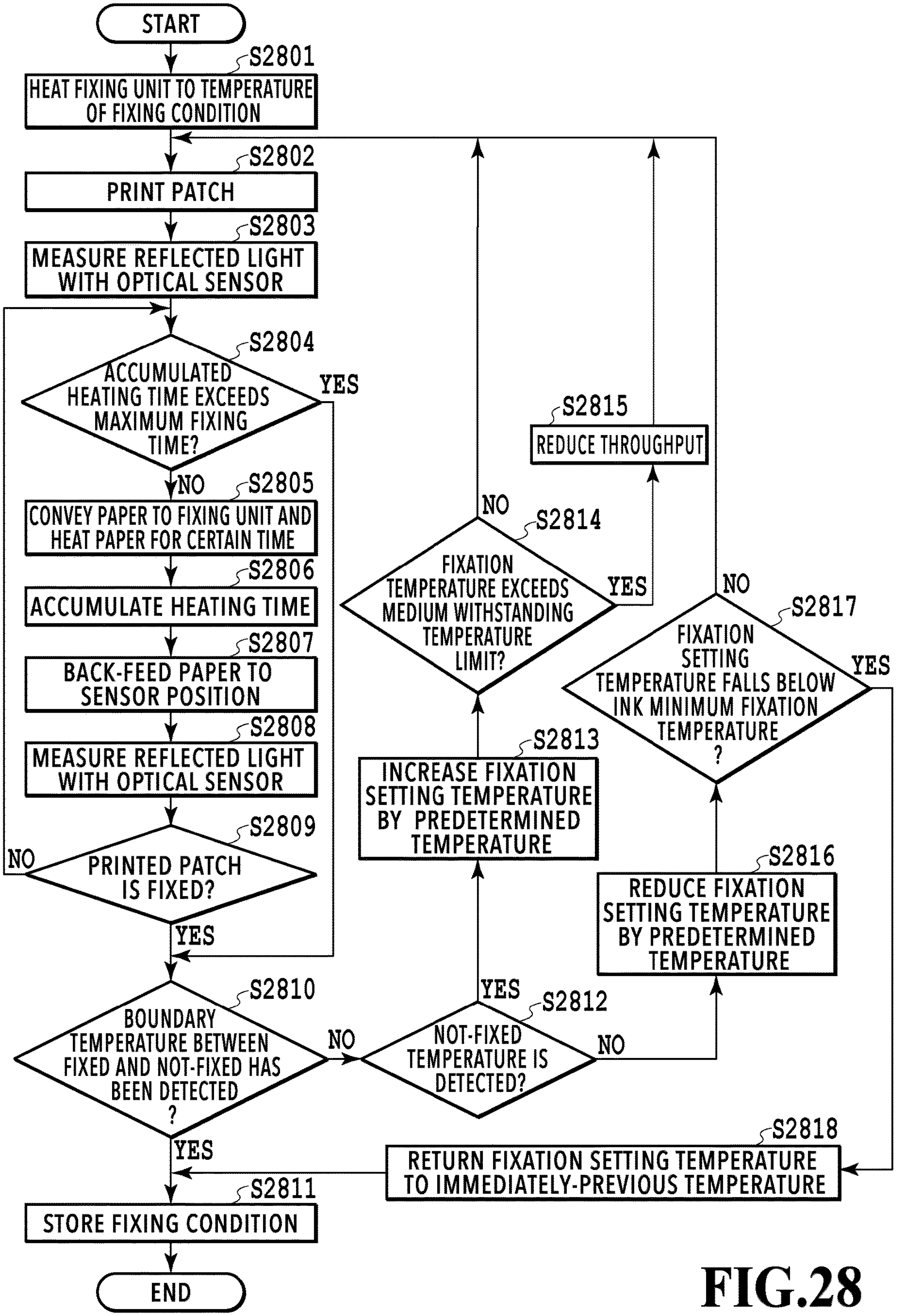
FIG. 28 is a diagram illustrating a detailed actual measurement flow of fixing condition automatic setting.

FIG. 28 is a diagram illustrating the detailed actual measurement flow of fixing condition automatic setting in the present embodiment. In the case where the detailed actual measurement flow of fixing condition automatic setting is started, in S2801, the CPU 501 heats the fixing unit 108 to the fixing condition stored in S2711, and sets the fixing unit 108 to a stable temperature state. Specifically, the process of actual detailed measurement is started with the fixing condition obtained in the estimation flow of fixing condition automatic setting being the initial setting. Processes of S2802 to S2809 are the same processes as the processes of S604 to S611.

In the case where the CPU 501 determines that the patch is fixed in S2809, the CPU 501 proceeds to S2810. In S2810, the CPU 501 determines whether a boundary between a fixed temperature and a not-fixed temperature has been detected. Moreover, in the case where the CPU 501 determines that the accumulated heating time has exceeded the maximum fixing time in S2804, the CPU 501 performs a process of proceeding to S2810. The detection of the boundary between the fixed temperature and the not-fixed temperature in S2810 means determining whether both of the fixed temperature and the not-fixed temperature are detected or not. For example, assume that the temperature setting resolution in the deriving of the fixing condition is set to a condition of a unit of 5° C., 95° C. has been detected as not fixed, and 100° C. has been detected as fixed. In this case, the CPU 501 determines that the detection of the boundary temperature is completed. In the case where only one of the not-fixed temperature and the fixed temperature is detected, the CPU 501 determines that the determination of the boundary of the temperatures is not completed.

As described above, in the estimation flow of fixing condition automatic setting, the process using the medium withstanding temperature limit is performed. Specifically, the estimation process is performed in a condition in which the fixation temperature is relatively high among the settable fixing conditions. A temperature as low as possible in the fixable condition range is preferable as the fixation temperature. Accordingly, it is possible to find the lowest-possible fixation temperature by detecting the boundary temperature. Note that, since the process using the medium withstanding temperature limit is not always performed in the estimation flow of fixing condition automatic setting, FIG. 28 is a flowchart describing a comprehensive process.

In the case where the CPU 501 determines that the boundary temperature is detected in S2810, the CPU 501 proceeds to S2811. In S2811, the CPU 501 saves the lowest setting temperature among the temperatures at which the patch is fixed as the fixing condition in the EEPROM 504 or the like of the printing apparatus. Then, the process of the flowchart of FIG. 28 is terminated.

Meanwhile, in the case where the CPU 501 determines that the boundary temperature is not detected in S2810, the CPU 501 proceeds to S2812. In S2812, the CPU 501 determines which one of the not-fixed temperature and the fixed temperature is not detected. In this example, the CPU 501 determines whether the not-fixed temperature is detected. In the case where the not-fixed temperature is detected, that is the CPU 501 determines that the fixed temperature is not detected, the CPU 501 proceeds to S2813. In S2813, the CPU 501 increases the fixation temperature by predetermined temperature (for example, 5° C.). Next, in S2814, the CPU 501 determines whether the fixation temperature after the increase of the fixation temperature exceeds the withstanding temperature limit of the medium. In the case where the fixation temperature does not exceed the withstanding temperature limit of the medium, the CPU 501 proceeds to S2802 and executes the series of processes of detecting the fixed state. In the case where the fixation temperature exceeds the withstanding temperature limit of the medium, the CPU 501 proceeds to S2815. In S2815, the CPU 501 reduces the throughput. Then, the CPU 501 executes the series of processes of detecting the fixed state from S2802 under a fixing condition in which the throughput is reduced. Note that, in S2815, the process illustrated in FIG. 7 may be performed.

In the case where the CPU 501 determines that the not-fixed temperature is not detected in S2812, the CPU 501 proceeds to S2816. In S2816, the CPU 501 reduces the fixation setting temperature by a predetermined temperature (for example, 5° C.). After reducing the fixation setting temperature in S2816, the CPU 501 proceeds to S2817.

In S2817, the CPU 501 determines whether the reduced fixation setting temperature falls below the ink minimum fixation temperature. In the case where the fixation setting temperature does not fall below the ink minimum fixation temperature, the CPU 501 proceeds to S2802, and executes the series of processes of fixed state detection. Meanwhile, in the case where the fixation setting temperature falls below the ink minimum fixation temperature, the CPU 501 proceeds to S2818. In S2818, the CPU 501 returns the fixation setting temperature to the immediately-previous temperature. Since the fixation setting temperature is reduced by 5° C. in S2816 in the present example, the fixation setting temperature is increased by 5° C. Next, in S2811, the CPU 501 stores the fixation setting temperature increased by 5° C. as the fixing condition. The detailed actual measurement flow of the fixing condition automatic setting is completed by the above flow.

Although the resolution of the temperature is set to 5° C. in the present embodiment, a finer resolution or a rougher resolution may be set. This resolution may be temperature of resolution defined in the printing apparatus in advance. Alternatively, the configuration may be such that the resolution can be set by the user and is a temperature unit of resolution defined by the user As described above, in the present embodiment, the fixed temperature is basically in a state where it has been estimated and detected by the estimation process of FIG. 27. Accordingly, in the process of FIG. 28, the process of detecting the not-fixed temperature is mainly performed in many cases. Description is given of the process of FIG. 28 in the case where the fixation setting temperature in S2801 (initial fixation temperature) is 110° C., 95° C. is the not-fixed temperature, and 100° C. is the fixed temperature. Determination of YES is made in first S2809, determination of NO is made in S2810, determination of NO is made in S2812, and the fixation setting temperature is reduced to 105° C. in S2816. Then, similar processes are performed, and the fixation setting temperature is set to the fixation temperature of 100° C. in second S2816. Furthermore, in another repeated process, the fixation setting temperature is set to the fixation temperature of 95° C. in the process of third S2816. In this case, in S2804, the CPU 501 determines that the accumulated heating time exceeds the maximum fixing time. In subsequent S2810, the CPU 501 determines that the boundary temperature is 95° C. and 100° C. based on the fact that the patch is fixed at 100° C. and is not fixed at 95° C., and proceeds to S2811. As described above, in the case where one of the fixed temperature and the not-fixed temperature is not determined but is known, both temperatures (that is the boundary temperature) are determined at the point where the other temperature is known. Although the example in which the fixation temperature is gradually reduced is described in the present example, the configuration is not limited to this example.

As described above, in the present embodiment, in the case where the user selects the execution of the automatic setting of the fixing condition, the estimation flow of fixing condition automatic setting is executed. Then, in the case where the user selects the execution of the detailed actual measurement flow of fixing condition automatic setting, the detailed actual measurement flow of fixing condition automatic setting is executed by using the fixing condition estimated in the estimation flow of fixing condition automatic setting. Accordingly, the processing time required to derive the fixing condition in the detailed actual measurement flow of fixing condition automatic setting can be reduced from that in the fifth embodiment.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Applications No. 2022-203097, filed Dec. 20, 2022 and No. 2023-137671, filed Aug. 28, 2023 which are hereby incorporated by reference wherein in their entirety.

What is claimed is:

1. A printing apparatus comprising:

a printing unit configured to print an image on a printing medium;

a conveying unit configured to convey the printing medium on which the image is printed in a conveyance direction;

a fixing unit configured to fix the image onto the printing medium by heating the printing medium on which the image is printed and that is conveyed by the conveying unit;

a measuring unit configured to measure a reflected light intensity of the image on the printing medium; and a control unit configured to set a fixing condition to be used for the printing medium based on a change in the reflected light intensity measured by the measuring unit in a fixing process of the image, wherein the control unit controls the conveying unit to convey the printing medium heated for a certain time in the fixing unit along the same conveyance path in an opposite direction to the conveyance direction, and causes the measuring unit to measure the reflected light intensity in the measuring unit.

2. The printing apparatus according to claim 1, wherein the measuring unit is arranged upstream of the fixing unit in the conveyance direction.

3. The printing apparatus according to claim 1, wherein the control unit obtains the change in the reflected light intensity by repeating conveyance of the printing medium from the measuring unit to the fixing unit and conveyance of the printing medium from the fixing unit to the measuring unit in the opposite direction and by repeating heating for the certain time and measurement of the reflected light intensity.

4. The printing apparatus according to claim 1, wherein the measuring unit measures a specular reflected light intensity of the image on the printing medium as the reflected light intensity.

5. The printing apparatus according to claim 1, wherein the control unit obtains the change in the reflected light intensity by calculating a difference of a measurement value measured by the measuring unit.

6. The printing apparatus according to claim 1, wherein the control unit obtains the change in the reflected light intensity by calculating a differential of a measurement value measured by the measuring unit.

7. The printing apparatus according to claim 1, wherein the control unit performs the control by setting a fixation temperature of the fixing unit to a predetermined fixation temperature.

8. The printing apparatus according to claim 7, wherein, in a case where an accumulated heating time of heating at the predetermined fixation temperature exceeds maximum fixing time, the control unit performs the control again at a fixation temperature higher than the predetermined fixation temperature.

9. The printing apparatus according to claim 7, wherein, in a case where an accumulated heating time of heating at the predetermined fixation temperature exceeds maximum fixing time and a fixation temperature higher than the predetermined fixation temperature exceeds a withstanding temperature limit of the printing medium, the control unit performs the control while reducing a throughput of a process of printing the image in the printing unit.

10. The printing apparatus according to claim 1, further comprising a detecting unit configured to detect an environment temperature, wherein the control unit is configured to store the environment temperature at time of setting of the fixing condition in a storage unit, and control the fixing unit such that fixing is performed under the fixing condition in a case where an image is printed by using the printing medium, and the fixing condition to be used for a received print job is corrected based on an environment temperature detected by the detecting unit at a time of reception of the print job and the environment temperature stored in the storage unit.

11. The printing apparatus according to claim 1, wherein the control unit is configured to store the reflected light intensity of the image at a time of setting of the fixing condition in a storage unit, and control the fixing unit such that fixing is performed under the fixing condition in a case where an image is printed by using the printing medium, and patches are printed on the printing medium at predetermined intervals to measure the reflected light intensity in a case where the printing apparatus receives a print job, and predetermined notification is performed in a case where a difference between the reflected light intensity stored in the storage unit and the reflected light intensity measured by using the patches exceeds a predetermined threshold.

12. The printing apparatus according to claim 11, wherein the predetermined notification is notification prompting resetting of the fixing condition.

13. The printing apparatus according to claim 12, wherein, in a case where the printing apparatus receives an instruction of performing the resetting of the fixing condition from a user in response to the predetermined notification, the control unit performs the control again.

14. The printing apparatus according to claim 1, wherein the control unit receives a mode of setting the fixing condition from a user, and performs the control depending on the received mode.

15. The printing apparatus according to claim 14, wherein the mode includes a first mode in which the fixing condition is detected while a fixation temperature is shifted at intervals of a predetermined temperature and a second mode in which the fixing condition is detected from a withstanding temperature limit of the printing medium set by the user.

16. The printing apparatus according to claim 15, wherein the control unit receives the mode of setting the fixing condition from the user before execution of the first mode and the second mode.

17. The printing apparatus according to claim 15, wherein the control unit receives selection of whether to execute the first mode from the user after execution of the second mode.

18. The printing apparatus according to claim 17, wherein, in a case where the first mode is executed after the execution of the second mode, the control unit executes the first mode by using the fixing condition detected in the second mode.

19. The printing apparatus according to claim 15, wherein the mode includes a third mode in which the control is not performed and the fixing condition is set by the user, and the control unit determines whether to execute the third mode before execution of the first mode and the second mode.

20. The printing apparatus according to claim 15, wherein the mode includes a third mode in which the control is not performed and the fixing condition is set by the user, and the control unit determines whether to execute the third mode before execution of the second mode.

21. The printing apparatus according to claim 14, wherein the fixing condition includes at least one of setting a temperature of the fixing unit, time of heating the printing medium with the fixing unit, a distance for which the printing medium is heated with the fixing unit, the number of passes used for printing on the printing medium, and an inter-scan wait used in the printing on the printing medium.

22. The printing apparatus according to claim 1, wherein the fixing unit comprises a heater, and a fixation temperature corresponds to a temperature of the heater.

23. The printing apparatus according to claim 1, wherein the control unit controls the conveying unit to convey the printing medium heated for a certain time in the fixing unit along the same conveyance path in an opposite direction to the conveyance direction at a speed greater than the speed used when conveying the printing medium toward the fixing unit.

* * * * *